United States Patent
Shirai et al.

(10) Patent No.: US 7,602,129 B2
(45) Date of Patent: Oct. 13, 2009

(54) ROTARY-MOTOR-LOADED DEVICE AND CONTROL CHARACTERISTIC MEASUREMENT METHOD AND PROGRAM

(75) Inventors: Katsumi Shirai, Kawasaki (JP); Eiji Okamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 491 days.

(21) Appl. No.: 11/489,696

(22) Filed: Jul. 19, 2006

(65) Prior Publication Data
US 2007/0229006 A1 Oct. 4, 2007

(30) Foreign Application Priority Data
Mar. 28, 2006 (JP) ............... 2006-088679

(51) Int. Cl.
*G11B 5/596* (2006.01)
*G05B 11/01* (2006.01)

(52) U.S. Cl. .................. 318/115; 318/560; 318/128; 360/77.02; 369/53.18; 369/247.1

(58) Field of Classification Search .......... 318/35, 318/115, 128, 560; 700/37, 45; 360/77.02, 360/77.03; 324/633; 369/53.1, 53.18, 44.29, 369/47.38, 247.1
See application file for complete search history.

(56) References Cited

U.S. PATENT DOCUMENTS

| | | | | |
|---|---|---|---|---|
| 6,285,634 B1* | 9/2001 | Abe et al. | ................ | 369/44.11 |
| 6,774,615 B2* | 8/2004 | Kosugi et al. | ............ | 324/76.48 |
| 6,970,405 B2* | 11/2005 | Tateishi et al. | ........... | 369/44.32 |
| 7,164,261 B2* | 1/2007 | Hashimoto et al. | ....... | 324/76.28 |
| 7,265,931 B2* | 9/2007 | Ehrlich | ..................... | 360/77.02 |
| 7,274,640 B2* | 9/2007 | Lee et al. | ................. | 369/53.18 |
| 7,321,801 B2* | 1/2008 | Saito | ........................... | 700/37 |
| 7,443,628 B2* | 10/2008 | Oyabu | ......................... | 360/71 |
| 7,460,330 B2* | 12/2008 | Takaishi | ................. | 360/78.04 |
| 2004/0257693 A1* | 12/2004 | Ehrlich | ..................... | 360/77.02 |
| 2007/0183278 A1* | 8/2007 | Yamada et al. | ........... | 369/44.29 |
| 2007/0211371 A1* | 9/2007 | Atsumi et al. | ............ | 360/77.08 |

FOREIGN PATENT DOCUMENTS

JP 2001-283506 10/2001

* cited by examiner

*Primary Examiner*—Walter Benson
*Assistant Examiner*—Eduardo Colon-Santana
(74) *Attorney, Agent, or Firm*—Greer, Burns & Crain, Ltd.

(57) ABSTRACT

A motor drive control unit includes a chip in which everything about a control system is provided and controls a spindle motor which rotates magnetic disks at a constant speed. When a measurement instruction is received from a disturbance generating unit and the upper-level device, sine wave disturbance is generated in the revolution speed of the spindle motor which depends on the motor drive control unit. A speed detecting unit detects the revolution speed of the spindle motor as measured data while the disturbance is being generated by the disturbance generating unit. A measured data transferring unit transfers the detected measured data detected by the speed detecting unit to the upper-level device, wherein control characteristics such as gains and phases with respect to frequencies of the motor control unit are computed.

19 Claims, 17 Drawing Sheets

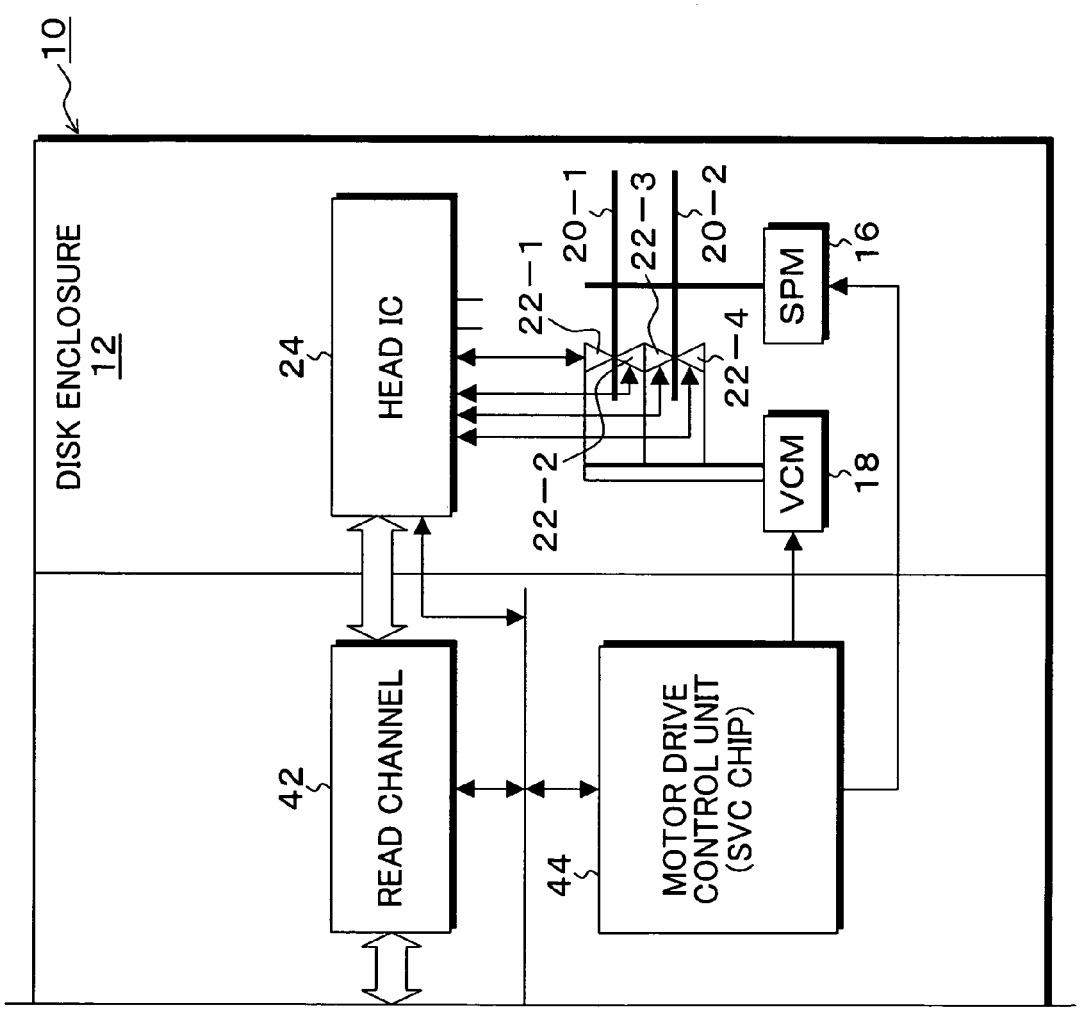

FIG. 6

| ADDRESS | TARGET REVOLUTION SPEED |
|---|---|
| 0001 | N0001 |
| 0002 | N0002 |
| 0003 | N0003 |
| ⋮ | ⋮ |
| 0256 | N0256 |
| 0257 | N0255 |
| 0258 | N0254 |
| 0259 | N0253 |
| ⋮ | ⋮ |
| 0512 | N0001 |
| 0513 | N0513 |
| 0514 | N0514 |
| 0515 | N0515 |
| ⋮ | ⋮ |
| 0768 | N0768 |
| 0769 | N0767 |
| 0770 | N0766 |
| 0771 | N0765 |
| ⋮ | ⋮ |
| 1024 | N0513 |

- 96-1: FIRST TABLE AREA ($0° \leq \theta < 90°$)
- 96-2: SECOND TABLE AREA ($90° \leq \theta < 180°$)
- 96-3: THIRD TABLE AREA ($180° \leq \theta < 270°$)
- 96-4: FOURTH TABLE AREA ($270° \leq \theta < 360°$)

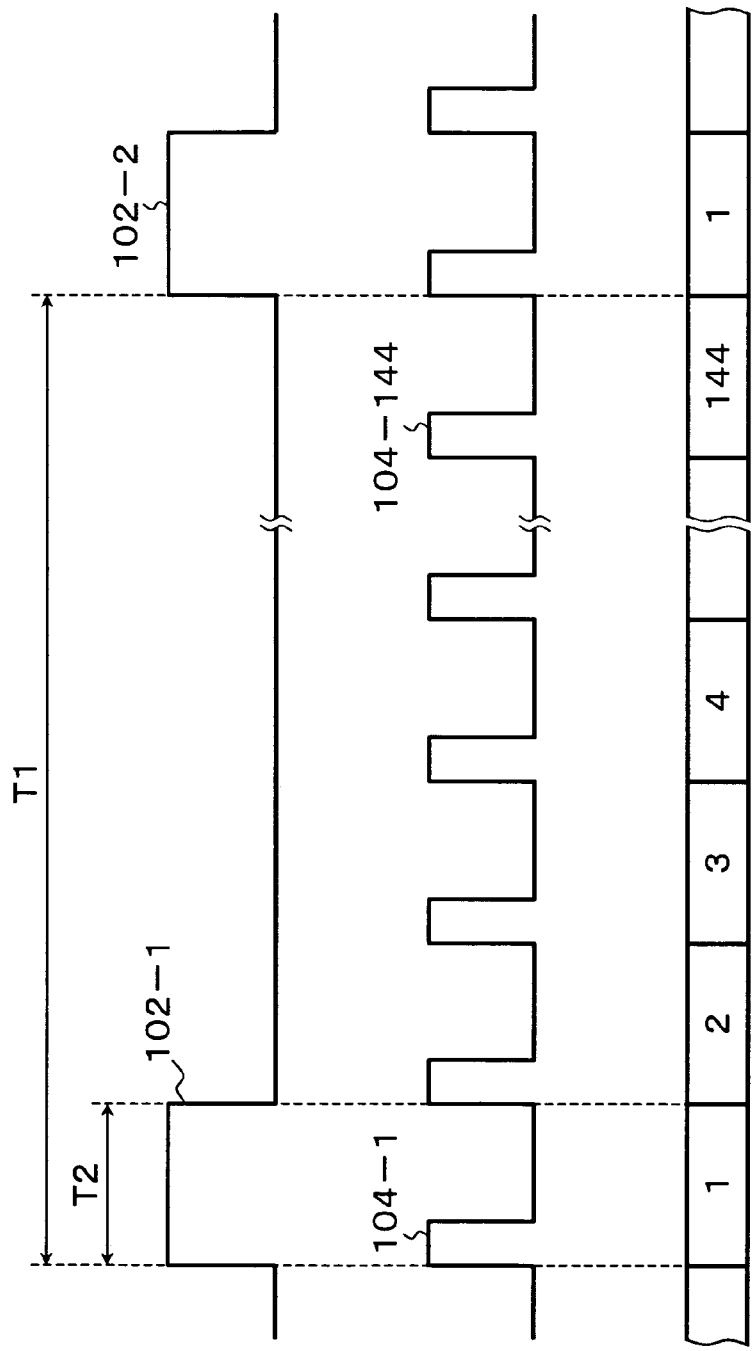

SECTOR PULSE

SERVO TASK

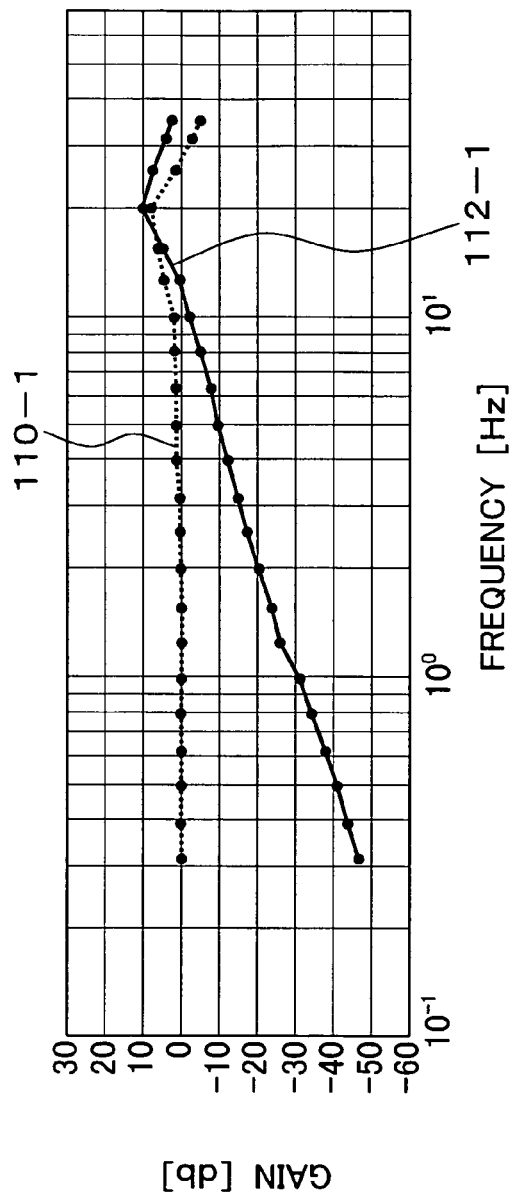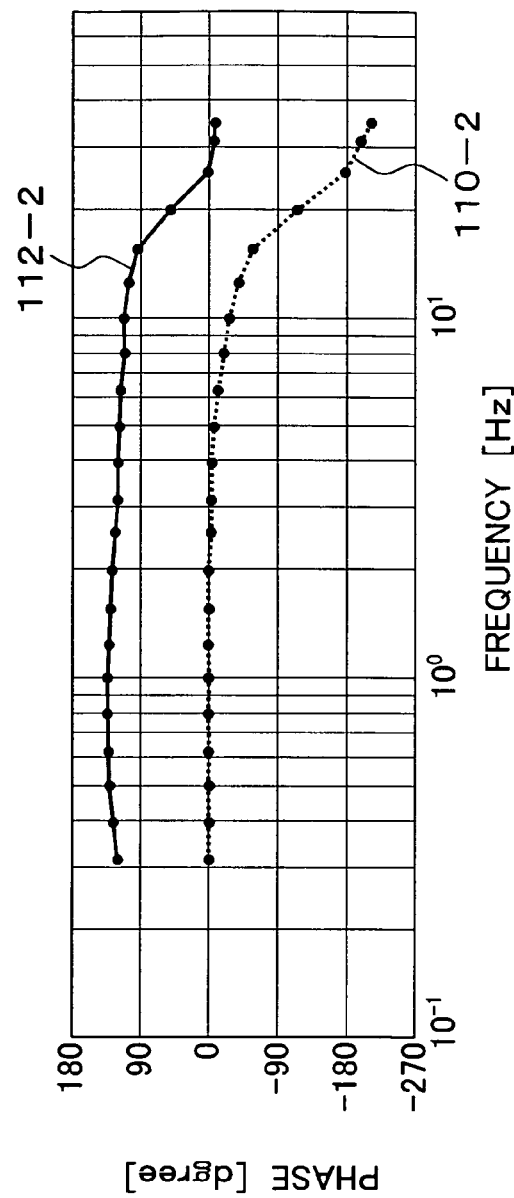
FIG. 11A
FIG. 11B

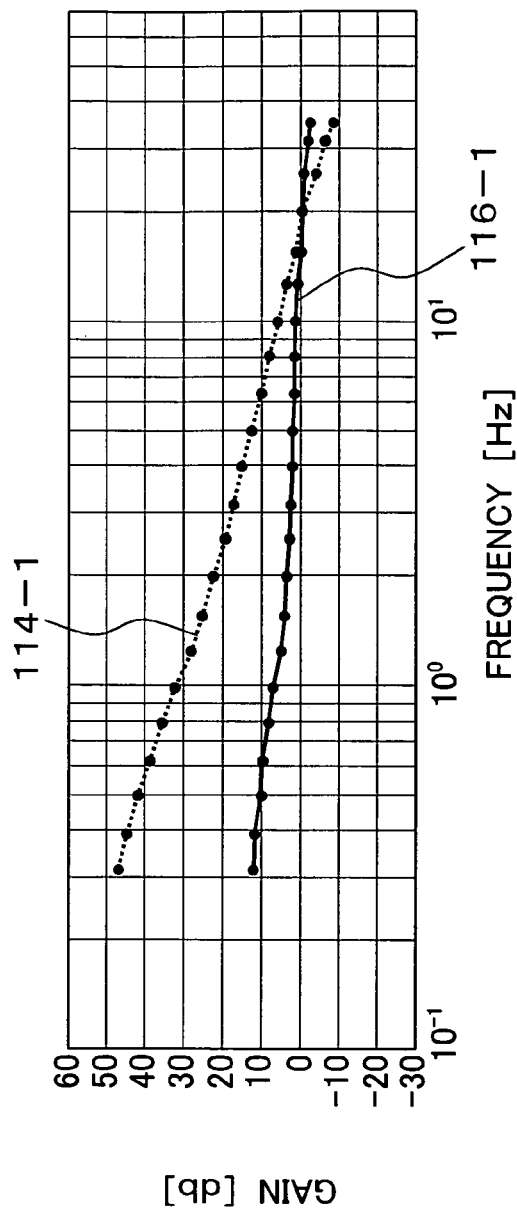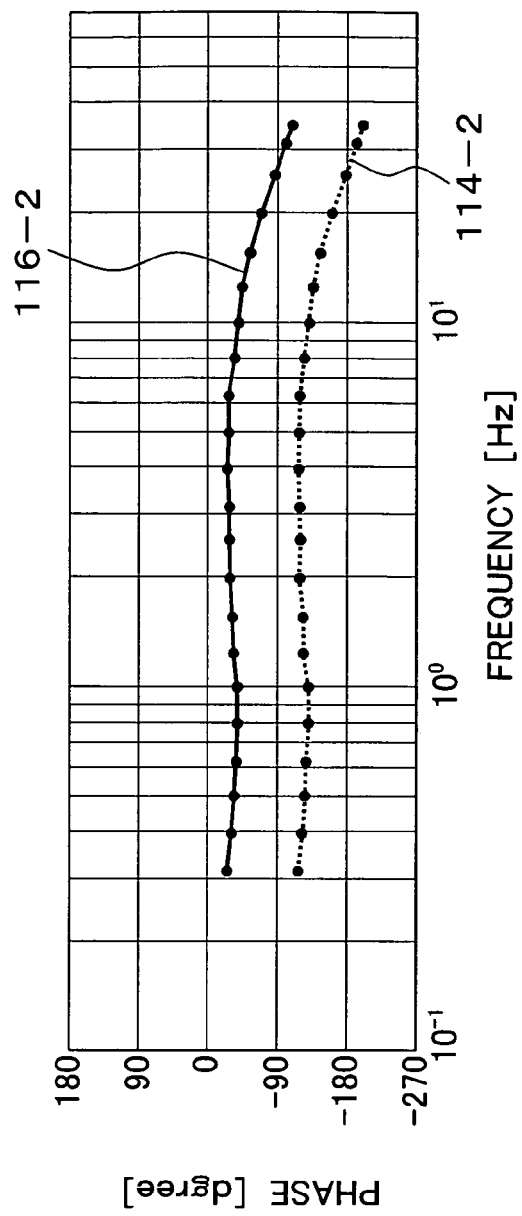
FIG. 12A
FIG. 12B

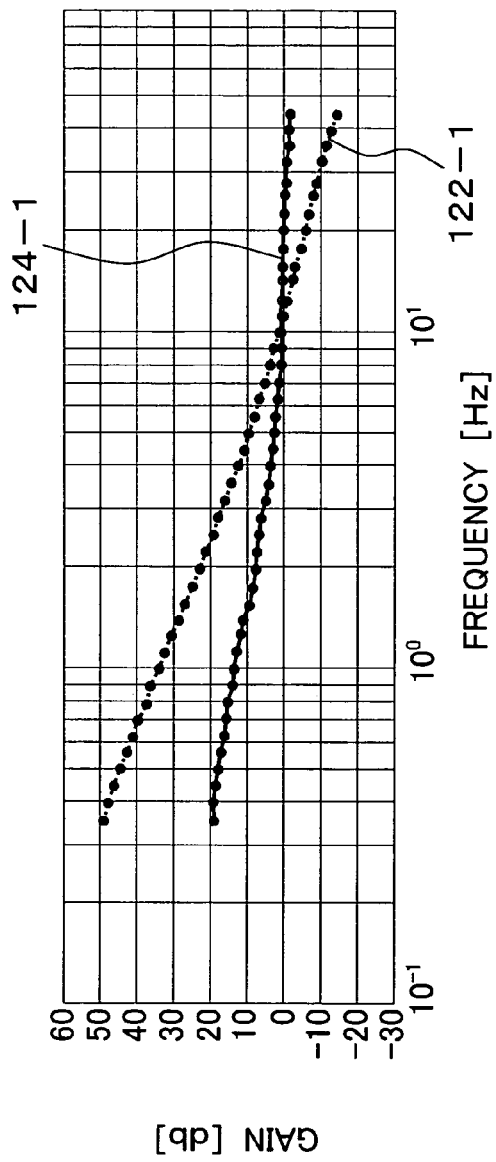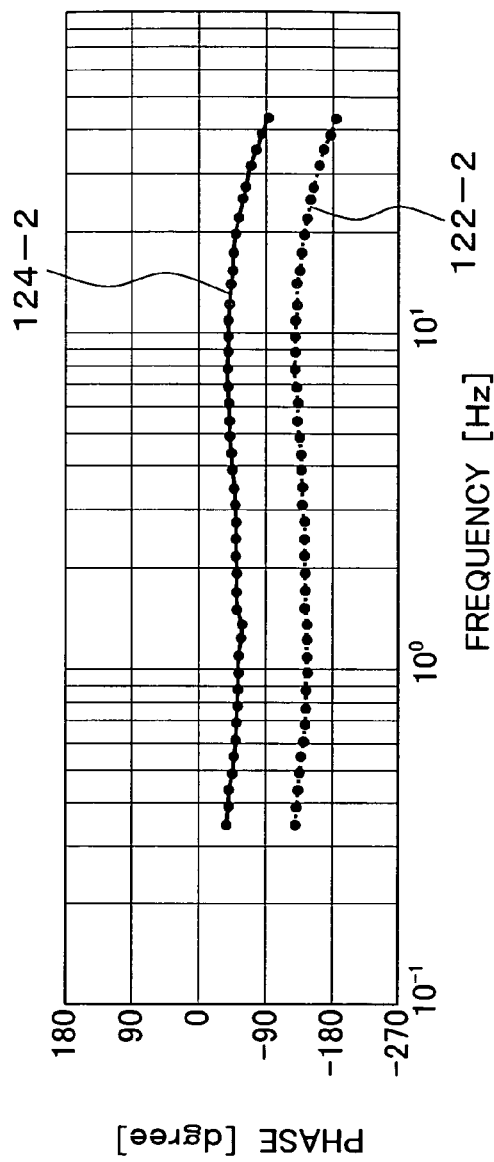
FIG. 14A
FIG. 14B

FIG. 15

| RESPONSE | CHARACTERISTICS | UNIT | FIRST SAMPLE | SECOND SAMPLE |
|---|---|---|---|---|
| OPEN LOOP RESPONSE | ZERO-CROSS FREQUENCY | [Hz] | 17.78 | 10.63 |
| | PHASE MARGIN | [deg] | 22.69 | 44.63 |
| | GAIN MARGIN | [db] | 3.57 | 12.90 |
| SENSITIVITY FUNCTION | PEAK GAIN | [db] | 9.78 | 3.74 |
| | PEAK FREQUENCY | [Hz] | 20.00 | 18.00 |
| | -3db BAND | [Hz] | 10.00 | 7.06 |
| CLOSED LOOP RESPONSE | PEAK GAIN | [db] | 7.72 | 3.03 |
| | PEAK FREQUENCY | [Hz] | 20.00 | 8.00 |
| | -3db BAND | [Hz] | 25.45 | 20.00 |

ROTARY-MOTOR-LOADED DEVICE AND CONTROL CHARACTERISTIC MEASUREMENT METHOD AND PROGRAM

This application claims priority based on prior application No. JP 2006-088679, filed Mar. 28, 2006, in Japan.

BACKGROUND OF THE INVENTION

1. Field of the Invention

The present invention relates to a rotary-motor-loaded device and control characteristic measurement method and program for measuring data which is required for computing control characteristics of a motor drive control unit which controls a rotary motor for rotating a rotation object at a predetermined revolution speed; and, particularly relates to a rotary-motor-loaded device and control characteristic measurement method and program for measuring the data required for computing the control characteristics by generating disturbance in control of a spindle motor by the device per se.

2. Description of the Related Arts

Conventionally, in a test process in the stage of manufacturing a magnetic disk device which is an example of a rotary-motor-loaded device, spot measurement and evaluation of control characteristics of a servo combo chip (SVC chip) which is a circuit chip having functions of a spindle motor driver, etc. of rotating magnetic disk media at a constant speed are performed. Methods for measuring the control characteristics of the SVC chip includes a method in which measurement is performed when the SVC chip is loaded on a board which is dedicated to evaluation and a method in which measurement is performed by use of a printed board of a device on which the SVC chip is mounted. When the measurement method using the board for evaluation is used, external data is input as signals through a signal input pin so as to generate disturbance in the revolution speed of the spindle motor. Meanwhile, in the case of the measurement method using the printed board on which the SVC chip is mounted, printed wiring is lead out from the surface of the printed board so as to input external data as signals and generate disturbance in the revolution speed of the spindle motor. In evaluation of the control characteristics in such measurement tests, in either method, the response revolution speed upon disturbance generation is measured by utilizing a measuring instrument such as an oscilloscope so as to detect measured data by plotting it, and gain characteristics and phase characteristics of the SVC chip are obtained from response data with respect to the disturbance variation, thereby evaluating them.

However, in such conventional measurement methods of the control characteristics of the SVC chip, it has become extremely difficult to measure and evaluate control characteristics of the SVC chip by use of dedicated evaluation boards and printed boards of devices since everything about a disk rotation control system according to a spindle motor is incorporated in a chip in recent SVC chips, and as package structures of SVC chips, leadless ball grid arrays (Ball Grid Array), QFN packages (Quad Flat Non-Leaded Package), etc. which do not have lead pins and are suitable for high-density packaging are used.

SUMMARY OF THE INVENTION

The present invention provides a rotary-motor-loaded device and control characteristic measurement method and program for enabling a device per se to measure data which is required for computing servo control characteristics of a spindle motor control unit in accordance with an instruction from an upper-level device by utilizing a high-speed transfer function of an already-equipped interface.

(Rotary-Motor-Loaded Device)

The present invention provides a rotary-motor-loaded device. The rotary-motor-loaded device of the present invention is characterized by having a motor drive control unit for controlling drive of a rotary motor for rotating a rotation object at a predetermined revolution speed;

a disturbance generating unit for generating sine wave disturbance in the revolution speed of the rotary motor when a rotation control characteristic is to be measured;

a speed detecting unit for detecting the revolution seed of the rotary motor as measured data while the disturbance is being generated by the disturbance generating unit; and a measured data transferring unit for outputting the measured data detected by the speed detecting unit to a control characteristic computing unit.

Herein, the disturbance generating unit reads a target revolution speed which changes as a sine wave from a sine value table and sets the speed in the motor drive control unit.

Also, the disturbance generating unit may be configured to compute a target revolution speed which changes as a sine value based on a predetermined amplitude and frequency and sets the speed in the motor drive control unit.

The rotary-motor-loaded device of the present invention is characterized by further having an interface for transferring a command and data to and from an upper-level device, and a buffer memory for storing data transmitted/received via the interface; wherein the disturbance generating unit reads measurement control information transferred from the upper-level device via the interface and stored in the buffer memory and generates the sine wave disturbance, the speed detecting unit reserves a measured result storage table in the buffer memory upon measurement initiation and writes the revolution speed detected during measurement as the measured data in the measured result table, and the measured data transferring unit reads the measured data stored in the measured result storage table and transfers the data to the control characteristics computing unit of the upper-level device by the interface.

The measured data transferring unit reads, in parallel with the write of the measured data to the measured result storage table performed by the speed detecting unit, measured data which is written before that and transfers the data to the upper-level device.

The speed detecting unit detects the revolution speed of the rotary motor based on an index signal which is output in accordance with revolution of a storage medium which is the rotation object. The speed detecting unit may be configured to detect the revolution speed of the rotary motor based on a motor index signal which is output in accordance with revolution of the rotary motor.

The measured data transferring unit outputs the measured data to the control characteristic computing unit and causes the unit to compute a gain characteristic and a phase characteristic with respect to a frequency of the motor drive control unit.

The rotary-motor-loaded device of the present invention is characterized by further having a control characteristic computing unit for computing a gain characteristic and a phase characteristic with respect to a frequency of the motor drive control unit based on the measured data.

The motor drive control unit is a circuit chip wherein everything about a drive control system required for drive control of the rotary motor is incorporated in the chip, and at least a target revolution speed can be set from outside.

(Method)

The present invention provides a control characteristic measurement method of a rotary-motor-loaded device. The present invention is characterized by having, in the control characteristic measurement method of the rotary-motor-loaded device having a motor drive control unit for controlling drive of a rotary motor for rotating a rotation object at a predetermined revolution speed, a disturbance generating step of generating sine wave disturbance in the revolution speed of the rotary motor when a rotation control characteristic is to be measured;

a speed detecting step of detecting the revolution seed of the rotary motor as measured data while the disturbance is being generated in the disturbance generating step; and a measured data transferring step of outputting the measured data detected in the speed detecting step to a control characteristic computing unit.

(Program)

The present invention provides a control characteristic measurement program. The control characteristic measurement program of the present invention is characterized by causing a computer of a rotary-motor-loaded device having a motor drive control unit for controlling a rotary motor for rotating a rotation object at a predetermined speed to execute a disturbance generating step of generating sine wave disturbance in the revolution speed of the rotary motor when a rotation control characteristic is to be measured;

a speed detecting step of detecting the revolution seed of the rotary motor as measured data while the disturbance is being generated in the disturbance generating step; and a measured data transferring step of outputting the measured data detected in the speed detecting step to a control characteristic computing unit for computing the control characteristics of the motor drive control unit.

(Control Device)

The present invention provides a control device (MPU) of a rotary-motor-loaded device. The present invention is characterized by having, in the control device of the rotary-motor-loaded device having a motor drive control unit for controlling a rotary motor for rotating a rotation object at a predetermined speed, a disturbance generating unit for generating sine wave disturbance in the revolution speed of the rotary motor when a rotation control characteristic is to be measured;

a speed detecting unit for detecting the revolution seed of the rotary motor as measured data while the disturbance is being generated by the disturbance generating unit; and a measured data transferring unit for outputting the measured data detected by the speed detecting unit to a control characteristic computing unit.

According to the present invention, since everything about a motor drive control unit of a spindle motor is incorporated in a chip, even when measurement using a dedicated evaluation board or a device printed board is difficult, measurement operations of the circuit chip of the motor drive control unit can be readily performed by the device per se when measurement conditions and disturbance generation data are transferred from an upper-level device which is connected by an interface, and measurement is performed by use of the measurement conditions and highly accurate disturbance generation data generated in the upper-level device; therefore, high-resolution measurement data can be obtained, and highly accurate analysis of frequency characteristics such as gains and phases can be performed from the measured data.

Moreover, since the control characteristics of the circuit chip of the motor drive control unit which serves as a measuring object are measured, leading out wiring from a dedicated measurement device or a printed board is not required; and, since merely connecting to the upper-level device by the interface is required, measurement operations are simple, and the control characteristics can be measured in a unit of completed storage device.

Therefore, adjustment corresponding to the measurement results of the control characteristics of circuit chips for motor driving current control can be readily performed for each of the devices in the stage of manufacturing the devices, and the performance of the devices and product yield can be improved.

Moreover, in the measurement process in which measurement firmware is downloaded to a storage device in a test process, disturbance is added to the rotation control of the spindle motor, and the response speed at that time is detected, a massive amount of measured data is detected since highly-accurate resolution is required; however, when, particularly, a signal line of the high-speed serial interface having a bidirectional communication function of a serial ATA or the like already provided in the storage device is utilized, transfer time will be about 30 minutes, and measurement and adjustment of each device can be efficiently realized without deteriorating manufacturing performance even when it is incorporated in a test process of a production line.

Moreover, in the present invention, since measurement is performed by use of the data generated in a personal computer which is outside the measurement device, there are effects that measurement frequency accuracy is excellent, highly accurate measured results are obtained, and analysis of frequency characteristics can be readily performed. Measurement resolution is high since target revolution values are generated by use of computing software of a personal computer outside the device, and measurement can be performed like actual measurement in terms of timing since existing firmware is utilized for measurement.

The measured data is recorded in a buffer of a disk device, uploaded to the personal computer by utilizing the interface, and can be utilized by computing software of the personal computer without modification; therefore, it can be immediately analyzed.

In addition, since the SVC chip can be directly manipulated, when measurement of a rotation target value register is changed, rotation variation signals in steady rotation control can be measured.

In addition, leading out of wiring from a dedicated measurement device or a printed board is also not required even for a chip in which merely a motor control function is incorporated; therefore, there is an effect that rotation control characteristics in product devices can be measured.

Furthermore, in any of the cases, adjustment of device properties corresponding to the rotation control characteristics can be readily applied to each device in the stage of manufacturing products. There is an advantage that analysis results can be managed individually for each device, which leads to improvement of reliability of products.

The above and other objects, features, and advantages of the present invention will become more apparent from the following detailed description with reference to the drawings.

BRIEF DESCRIPTION OF THE DRAWINGS

FIGS. 1A and 1B are block diagrams of a magnetic disk device showing an embodiment of a storage device according to the present invention;

FIG. 6 is an explanatory diagram of a sine wave disturbance table used in the present embodiment;

FIGS. 7A to 7C are time charts of index pulses and sector pulses in the present embodiment;

FIGS. 11A and 11B are characteristic charts of gains and phases with respect to frequencies of closed loop responses and sensitive function responses obtained from measured data of a first sample;

FIGS. 12A and 12B are characteristic charts of gains and phases with respect to frequencies of open loop responses and controller responses obtained from measured data of the first sample;

FIGS. 14A and 14B are characteristic charts of gains and phases with respect to frequencies of open loop responses and controller responses obtained from measured data of the second sample; and FIG. 15 is an explanatory diagram of a list displaying characteristics shown in FIGS. 11A to 14B.

DETAILED DESCRIPTION OF THE PREFERRED EMBODIMENTS

Figure 1A:
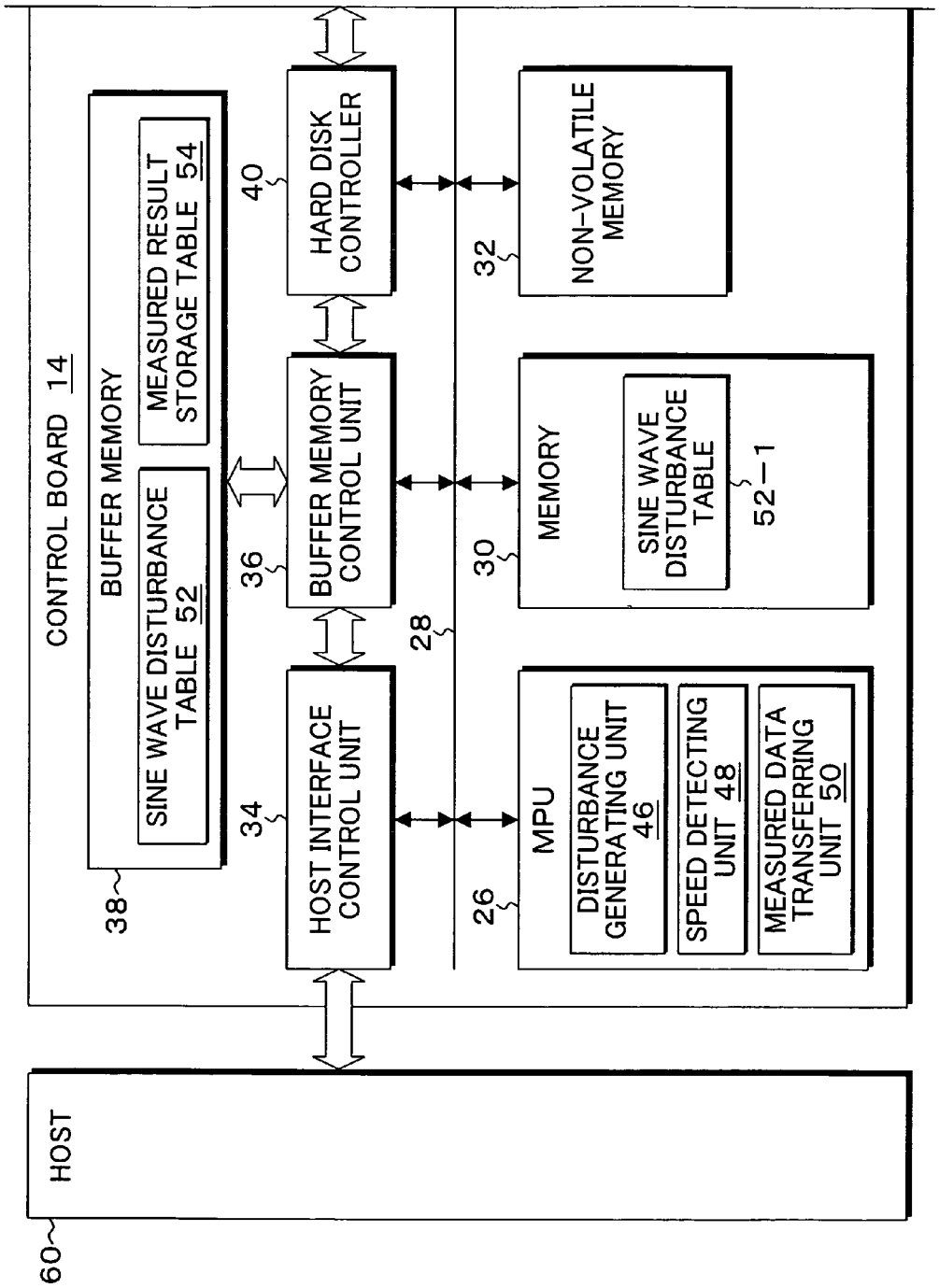

FIGS. 1A and 1B are block diagrams of a magnetic disk device showing an embodiment of a storage device according to the present invention. In FIGS. 1A and 1B, the magnetic disk device 10 known as a hard disk drive (HDD) is comprised of a disk enclosure 12 and a control board 14 having a circuit element mounted on a printed board. A spindle motor 16 is provided in the disk enclosure 12, magnetic disks 20-1 and 20-2 are attached to the rotation shaft of the spindle motor 16, and they are rotated at a constant revolution speed, for example, 4200 rpm. In addition, a voice coil motor 18 is provided in the disk enclosure 12, the voice coil motor 18 has heads 22-1 to 22-4 loaded on the distal ends of the arms of head actuators, thereby performing head positioning with respect to the recording surface of the magnetic disks 20-1 and 20-2. Write head elements and read head elements are loaded on the head 22-1 and 22-2 in an integrated manner. The recording method for the magnetic disks 20-1 and 20-2 in the disk enclosure 12 may be either the longitudinal magnetic recording method or the perpendicular magnetic recording method. The heads 22-1 to 22-4 are connected to a head IC 24 by signal lines, and the head IC 24 selects one of the heads by a head select signal based on a write command or a read command from a host 60 which serves as an upper-level device, thereby performing a write or a read. Moreover, in the head IC 24, a write amplifier is incorporated for a write system, and a preamplifier is incorporated for a read system. An MPU 26 is provided in the control board 14, and with respect to a bus 28 of the MPU 26 provided are a memory 30 using RAM for storing a control program and control data and a nonvolatile memory 32 using a flash ROM or the like for storing a control program. In addition, to the bus 28 of the MPU 26 provided are a host interface control unit 34, a buffer memory control unit 36 for controlling a buffer memory 38, a hard disk controller 40 which functions as a format control unit, a read channel 42 which functions as a write modulation unit and a read modulation unit, and a motor drive control unit 44 for controlling drive of the voice coil motor and the spindle motor. As the host interface control unit 34, for example, Serial ATA or the like known as a high-speed serial interface is used, and commands and data are transmitted at high speeds through packet transfer between it and the host 60. Moreover, in the motor drive control unit 44, all of the circuit functions constituting drive control such as, at least a current control circuit of the spindle motor 16 are provided in the chip of an SVC chip for realizing the motor drive control unit 44, and a drive control system such as a current control circuit of the voice coil motor 18 is also provided in the chip. The SVC chip is connected to the bus 28 and connected to the spindle motor 16 and the voice coil motor 18 which are in the load side. The magnetic disk device 10 performs a write/read process based on a command from a personal computer which functions as a user host. Herein, normal operations in the magnetic disk device 10 will be described below. When a write command and write data from the host is received by the host interface control unit 34, the write command is decoded by the MPU 26, and the received write data is stored in the buffer memory 38 in accordance with needs. Then, it is converted into a predetermined data format in the hard disk controller 40, an ECC code is added thereto in an ECC process, and scramble RLL code conversion and, further, write compensation is performed in a write modulation system in the read channel 42. Then, the data is written to the disk medium 20-1 from the write amplifier incorporated in the head IC 24 and from, for example, the write head element of the head 22-1 which is selected at that time. In this course, a head positioning signal is given to the motor drive control unit 44, and, after a target track which is specified by the command is sought, the head is placed on the track so as to perform track following control. On the other hand, when a read command from the host is received by the host interface control unit 34, the read command is decoded by the MPU 26, and signals read from the read head element that is selected by head selection of the head IC 24 are amplified by the read amplifier. Then, they are input to a read modulation system of the read channel 42, read data is modulated by, for example, partial response maximum likelihood detection (PRML), and an ECC process is performed in the hard disk controller 40 so as to detect and correct errors. Then, buffering to the buffer memory 38 is performed, and the read data is transferred from the host interface control unit 34 to the host. Regarding such magnetic disk device 10, in the present embodiment, for example in a test process in the stage of manufacturing the magnetic disk device 10, measurement firmware for measuring control characteristics of the motor drive control unit 44 is downloaded from the host (upper-level device) 60 such as a personal computer installed in test equipment to the nonvolatile memory 32, and the downloaded firmware is executed, thereby measuring control characteristics of the motor drive control unit 44.

Figure 2:
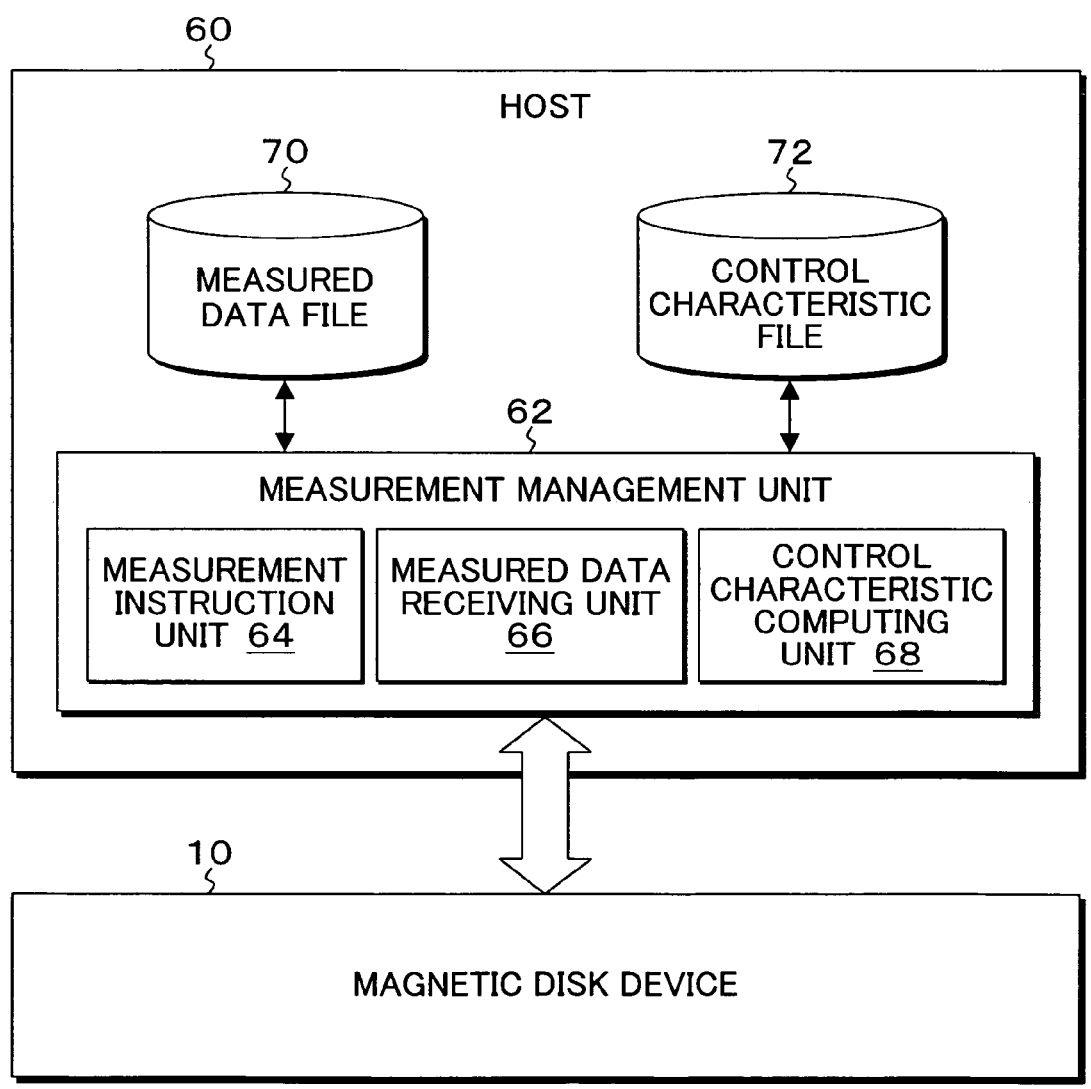
FIG. 2 is a block diagram of a functional configuration of an upper-level device in the present embodiment.

FIG. 2 is a block diagram of a functional configuration of the host provided in the test equipment in the present embodiment. In FIG. 2, a measurement management unit 62 is provided in the host 60 using a personal computer or the like, and in the measurement management unit 62 provided are functions of a measurement instruction unit 64, a measured data receiving unit 66, and a control characteristic computing unit 68. In addition, with respect to the measurement management unit 62, a measured data file 70 and a control characteristic file 72 are provided. The measurement management unit 62 is activated in a state in which the firmware for executing measurement processes of the motor drive control unit 44 is downloaded to the magnetic disk device 10 which serves as a measuring object, and measurement conditions required for executing control characteristics in the magnetic disk device 10 and sine wave disturbance data for generating sine wave disturbance in the revolution speed of the spindle motor are transferred from the measurement instruction unit 64. When start of measurement is instructed by the measurement instruction unit 64 after the measurement conditions and the sine wave disturbance data are transferred therefrom, measurement operations with respect to the motor drive control unit 44 are executed in the magnetic disk device 10 side, thereby generating measurement data which is required for computing of the control characteristics, specifically, sine wave disturbance and measuring the revolution speed when revolution of the spindle motor is controlled; and this is received by the measured data receiving unit 66 and stored in the measured data file 70. In a state in which the measured data from the magnetic disk device 10 is stored in the measured data file 70, the control characteristic computing unit 68 computes, based on the measured data, characteristics such as gains and phases with respect to frequencies as control characteristics of the motor drive control unit 44 of the magnetic disk device 10, and the computed control characteristics are stored in the control characteristic file 72. As the control characteristic computing unit 68, software which is dedicated to computing is executed as an application. In addition, in realization of the present invention, a command for measurement is prepared as a vendor unique command in the device. The command for measurement has functions of detecting speed information, manipulating the target speed, and generating sine wave disturbance. In addition to the firmware in the device, an interface tool for issuing the command for measurement is prepared.

Referring again to FIGS. 1A and 1B, corresponding to the measurement management unit 62 of the host 60 in the test equipment shown in FIG. 2, as functions which come with execution of the firmware for measurement which is downloaded from the host 60 to the nonvolatile memory 32, a disturbance generating unit 46, a speed detecting unit 48, and a measured data transferring unit 50 are provided in the MPU 26 of the magnetic disk device 10 which serves as a measurement object of the present embodiment. In response to transfer of the measurement conditions and the sine wave disturbance data from the host 60 accompanying measurement initiation, a sine wave disturbance table 52 is stored in the buffer memory 38, the sine wave disturbance table 52 is deployed to the memory 30 as a sine wave disturbance table 52-1 upon initiation of the measurement, and the disturbance generating unit 46 of the MPU 26 uses the stored data of the sine wave disturbance table 52-1 so as to generate sine wave disturbance in the revolution speed of the spindle motor 16 which depends on the motor drive control unit 44. Meanwhile, a measured result storage table 54 is prepared in the buffer memory 38 upon initiation of the measurement, wherein detected speeds detected by the speed detecting unit 48 of the MPU 26 are stored as speed data. When a measurement instruction is received from the host 60, the disturbance generating unit 46 generates sine wave disturbance in the revolution speed of the spindle motor 16 which depends on the motor drive control unit 44. The generation of sine wave disturbance performed by the disturbance generating unit 46 is either in a method in which disturbance is generated by use of the sine wave disturbance table 52-1 transferred from the host 60 or a method in which sine wave disturbance is computed based on a sine wave amplitude frequency in the measurement conditions transferred from the host 60 and added to a target revolution speed so as to generate it. The present embodiment employs, as an example, the case in which the sine wave disturbance is generated in the revolution speed of the spindle motor 16 by use of the sine wave disturbance table 52-1 transferred from the host 60. The speed detecting unit 48 detects the revolution speed of the spindle motor 16 as measured data while sine wave disturbance is being generated by the disturbance generating unit 46, and stores it in the measured result storage table 54 of the buffer memory 38. The speed detection of the spindle motor 16 performed by the speed detecting unit 48 employs either (1) a method in which it is detected from an index signal which is obtained from a read signal of the magnetic disk or
(2) a method in which it is detected from a motor index signal of the spindle motor 16. The present embodiment employs the method of (1) in which the revolution speed is detected from the index signal of the magnetic disk. The measured data transferring unit 50 transfers the measured data, i.e., the speed detection data, which has been detected by the speed detecting unit 48 and stored in the measured result storage table 54, from the host interface control unit 34 to the host 60 via a high-speed serial interface, stores it in the measured data file 70 shown in FIG. 2, and causes the control characteristic computing unit 68 to compute control characteristics such as gains and phases with respect to frequencies. In the transfer performed by the measured data transferring unit 50 with respect to the host 60, when a predetermined buffer amount is satisfied, the data is read and transferred. It should be noted that write to the buffer memory 38 and the read transfer can be performed in parallel. By virtue of the read/transfer in parallel with write to the measured result storage table 54 of the measured data, even when the data amount of the measured data obtained by execution of measurement of the motor drive control unit 44 is increased, a massive amount of measured data can be efficiently transferred to the host 60 without increasing the capacity of the measured result storage table 54 which is disposed in the buffer memory 38, as a result, the measurement time in the magnetic disk device 10 can be shortened. As a specific embodiment of FIGS. 1A, 1B and 2, as the measurement management unit 62 in the host 60 of FIG. 2, the command for measurement for executing processes for obtaining measured data which is required for computing control characteristics of the rotary motor of the motor drive control unit 44 in the magnetic disk device 10 of FIGS. 1A and 1B are prepared. The command for measurement realizes the function of manipulating a target speed in the disturbance generating unit 46, the function of generating sine wave disturbance, the function of detecting the spindle motor revolution speed by the speed detecting unit 48 during generation of the sine wave disturbance, and a function of the transfer process of the detected revolution speed by the measured data transferring unit 50. Furthermore, in addition to the functions as the firmware for realizing the measurement command, the interface tool for issuing the measurement command is prepared.

Figure 3:
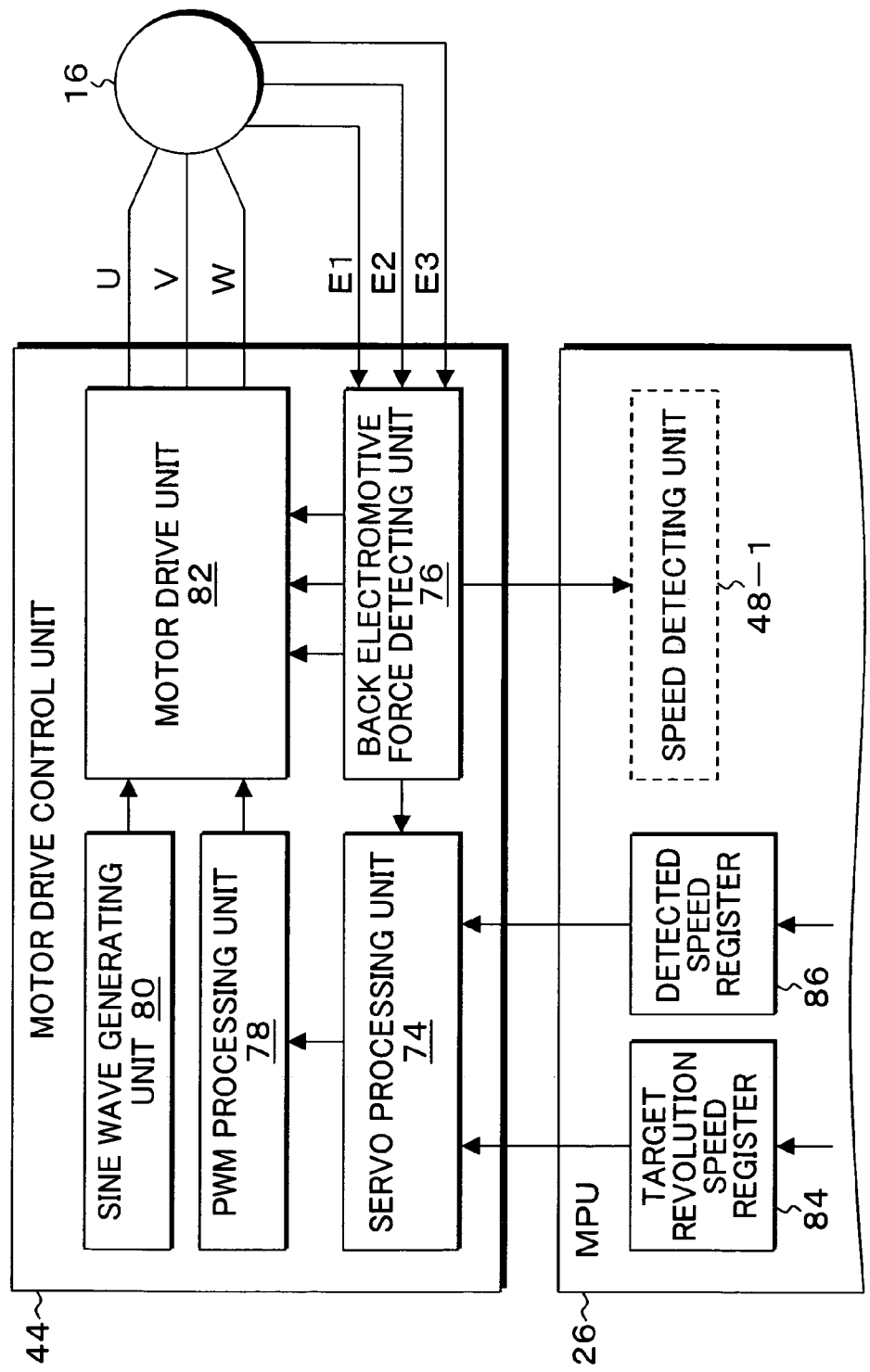
FIG. 3 is a block diagram of the motor drive control unit for controlling the spindle motor of FIGS. 1A and 1B.

FIG. 3 is a block diagram of the motor drive control unit 44 for controlling the spindle motor 16 in the present embodiment of FIGS. 1A and 1B. In FIG. 3, the motor drive control unit 44 is comprised of a servo processing unit 74, a back electromotive force detecting unit 76, a PWM processing unit 78, a sine wave generating unit 80, a motor drive unit 82, etc. Furthermore, for control characteristic measurement of the rotary motor of the motor drive control unit 44 in the present invention, a target revolution speed register 84 and a detected speed register 86 are provided in the side of the MPU 26. In response to setting of a target revolution speed including sine wave disturbance generated in the disturbance generating unit 46 provided in the MPU 26 of FIGS. 1A and 1B, the target revolution speed register 84 sets that to the servo processing unit 74. The detected speed register 86 stores the detected speed detected from the index pulse in the speed detecting unit 48 of the MPU 26 of FIGS. 1A and 1B, and outputs that to the servo processing unit 74. Herein, a three-phase brushless motor is used as the spindle motor 16; with respect to setting of a target revolution speed of a constant revolution number, for example, 4200 rpm, feedback of the revolution speed of the brushless DC motor is performed by detecting back electromotive force of, for example, a three-phase stator coil, thereby obtaining deviation from the target revolution speed; and servo processing for subjecting the driving currents of the phases with respect to the spindle motor 16 is performed for eliminating the deviation. Note that another speed detecting unit 48-1 for detecting the revolution speed based on the motor index signal of the spindle motor 16, specifically, the back electromotive force detection signal from the back electromotive force detection unit 76 can be provided in the MPU 26 side. When any one of three-phase back electromotive force detection signals E1 to E3 output from the spindle motor 16 is input to the speed detecting unit 48-1, and the back electromotive force detection signal is subjected to frequency dividing, the revolution speed of the spindle motor 16 can be detected.

Figure 4:
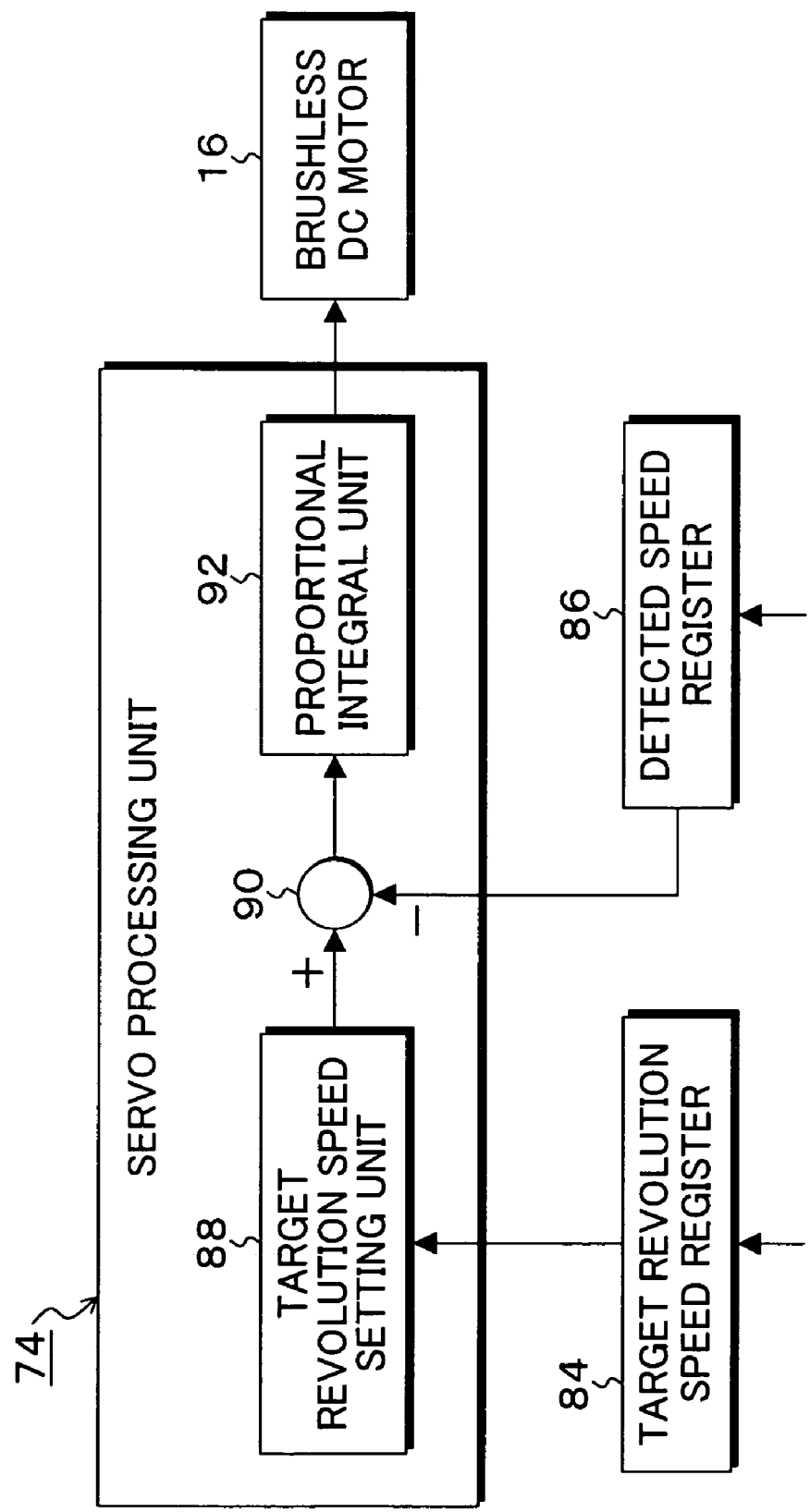
FIG. 4 is a block diagram of the servo processing unit of FIG. 3.

FIG. 4 is a block diagram of the servo processing unit 74 of FIG. 3, wherein it is comprised of a target revolution speed setting unit 88, an adder unit 90, and a proportional integral unit 92. The servo processing unit 74 obtains speed deviation by outputting a target revolution speed which is according to the target revolution speed setting unit 88 to the adder unit 90, inputting the revolution speed of the spindle motor 16 from the detection speed register 86, and subjecting them to subtraction. The speed deviation is input to the proportional integral unit 92, a proportional integral operation based on a proportional constant Kp and an integral constant Ki is performed, the proportional integral output is converted into a current signal, thereby driving the spindle motor 16. As is clear from FIG. 3 and FIG. 4, in the motor drive control unit 44 in the present embodiment of FIGS. 1A and 1B, everything of the motor driving current control system of the spindle motor is provided in the SVC chip which constitutes the motor drive control unit 44, and it is configured such that the target revolution speed and the detection speed can be set from outside.

Figure 5:
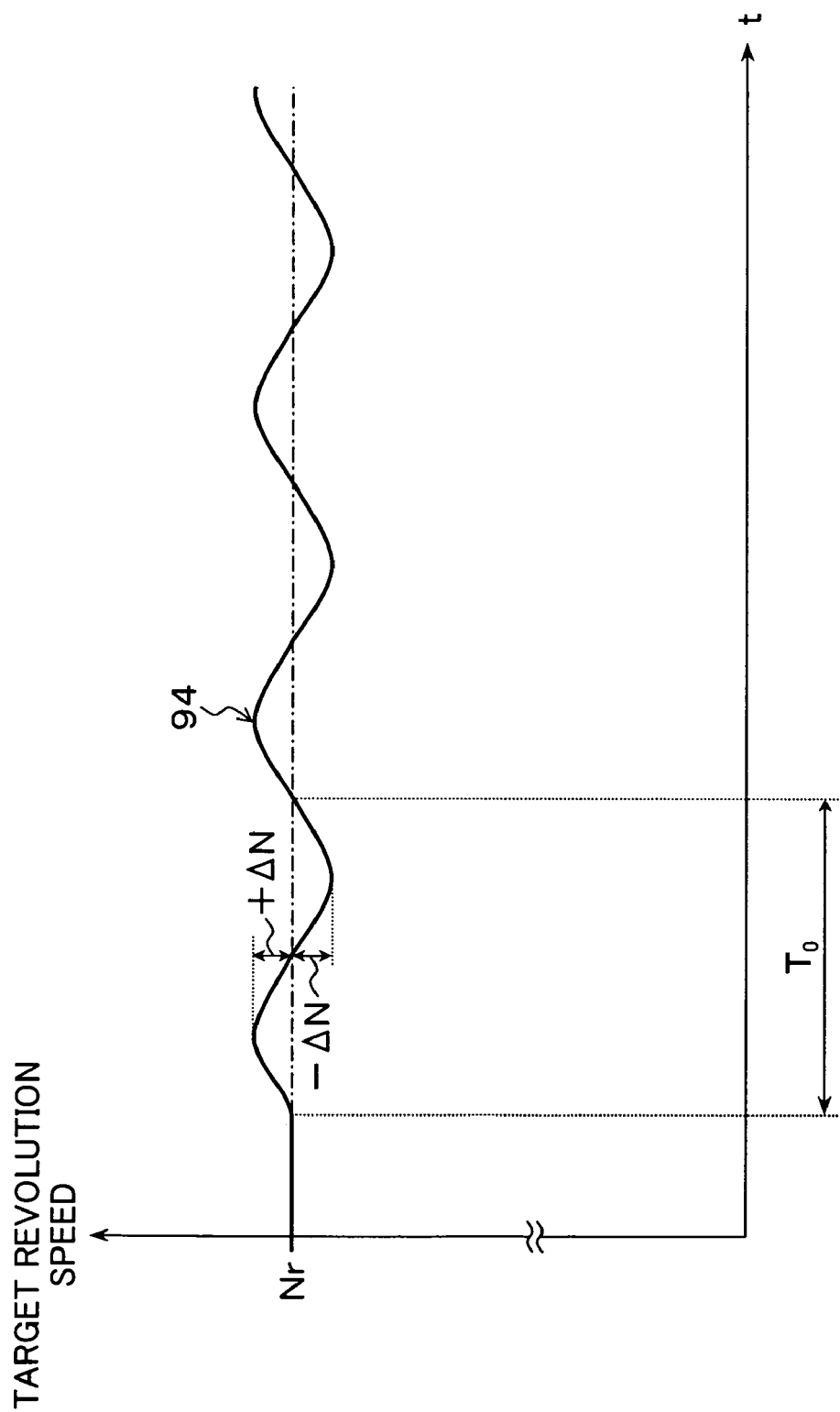
FIG. 5 is an explanatory diagram of sine wave disturbance of a target revolution speed generated in the present embodiment.

FIG. 5 is an explanatory diagram of sine wave disturbance of a target revolution speed generated in the present embodiment. In FIG. 5, a constant target revolution speed Nr is fixedly set as default, and the target revolution speed Nr is, for example, 4200 rpm. In a measurement process of the present invention with respect to such target revolution speed Nr, sine wave disturbance 94 having a constant amplitude ±ΔN and a constant cycle T0 is generated as a target revolution speed from, for example, measurement initiation time t1 by the disturbance generating unit 46, the spindle motor 16 is controlled by the motor drive control unit 44 such that speed variation of the sine wave disturbance 94 is generated, the actual revolution speed of the spindle motor 16 is detected in a state in which the revolution speed is controlled according to the sine wave disturbance 94, and it is written to the measured result storage table 54 of the buffer memory 38 as measured data. The sine wave disturbance 94 generated in the present embodiment can be obtained by the following expression when the default constant target revolution speed is Nr, the sine wave amplitude is ±ΔN, each frequency is ω (=2πf).

$$N = Nr \pm \Delta N \sin \omega t \qquad (1)$$

As a result of performing an experiment according to the sine wave disturbance, unless the amplitude ±ΔN in the sine wave disturbance 94 is suppressed to about ±2/mil, an error is caused in revolution speed check of firmware that the magnetic disk device originally has. Note that, one mil is 1/1000 inch, ±2/mil represents inclination and means that movement of one mil in a horizontal direction causes a ±2 mil change in a vertical direction. This inclination is the inclination of the zero-cross point of the sine wave, and the amplitude is determined when this inclination is determined. Meanwhile, even when the sine wave disturbance amplitude is reduced to ±1/mil, data of gains and phases is obtained in satisfactory accuracy in generation of the sine wave disturbance amplitude value of 1024 points. Therefore, as an example of the present embodiment, the sine wave disturbance amplitude ±ΔN is, for example, 1.34/mil. The measurement point number is 1024 points. Moreover, settling time from setting of the target revolution speed until it is stabilized is required, wherein the settling time of about 0.2 second is satisfactory.

FIG. 6 is an explanatory diagram of the sine wave disturbance table 52 used in generation of the sine wave disturbance 94 of FIG. 5. The sine wave disturbance table 52 is comprised of addresses 98 and target revolution speeds 100. The addresses 98 are values corresponding to angles which are obtained by dividing one cycle 360° of the sine wave into 1024 points which are measurement points. The target revolution speeds 100 are revolution speeds which are obtained by substituting the angular speeds ωt of the 1024 addresses of the addresses 98 into the above described expression (1) and have values of N0001 to N0513. More specifically, the target revolution speed can be calculated by the above described expression (1) while increasing the angle by (2π/1024) for one address. The sine wave disturbance table 52 is comprised of a first table area 96-1, a second table area 96-2, a third table area 96-3, and a fourth table area 96-4 which are obtained by dividing the table at every 90°. The target revolution speeds N0001 to N0256 of the first table area 96-1 become the target revolution speeds N0255 to N0001 of the second table 96-2 when the order thereof is changed. The third table area 96-3 has the values which are negative values of the first table area 96-1, and the fourth table area 96-4 has values which are negative values of the values of the second table area 96-2 as well.

FIGS. 7A to 7C are time chart of the index pulses and sector pulses in the present embodiment, which is used for determining the timing for changing the target revolution speed at each timing of the 1024 points shown in FIG. 6.

FIG. 7A shows index pulses, wherein each of index pulses 102-1 and 102-2 is generated one time in one rotation time T1 of the disk. Therefore, in the speed detecting unit 48 of FIGS. 1A and 1B, when the index pulses obtained per unit time are counted, the disk revolution speed which depends on the spindle motor 16 can be detected.

FIG. 7B shows sector pulses, wherein 144 sector pulses 104-1 to 104-144 is obtained in one rotation of the disk in the present embodiment. As shown in FIG. 7C, sector numbers from first to 144th are imparted to sector zones of the disk medium divided by the sector pulses. In the present embodiment, the target revolution speed is changed one time for one sector, and, since the target revolution speed is changed at the 1024 points, sine wave disturbance of one cycle is generated according to 1024 points/144 sectors=7.111 revolutions.

Figures 8A, 8B:
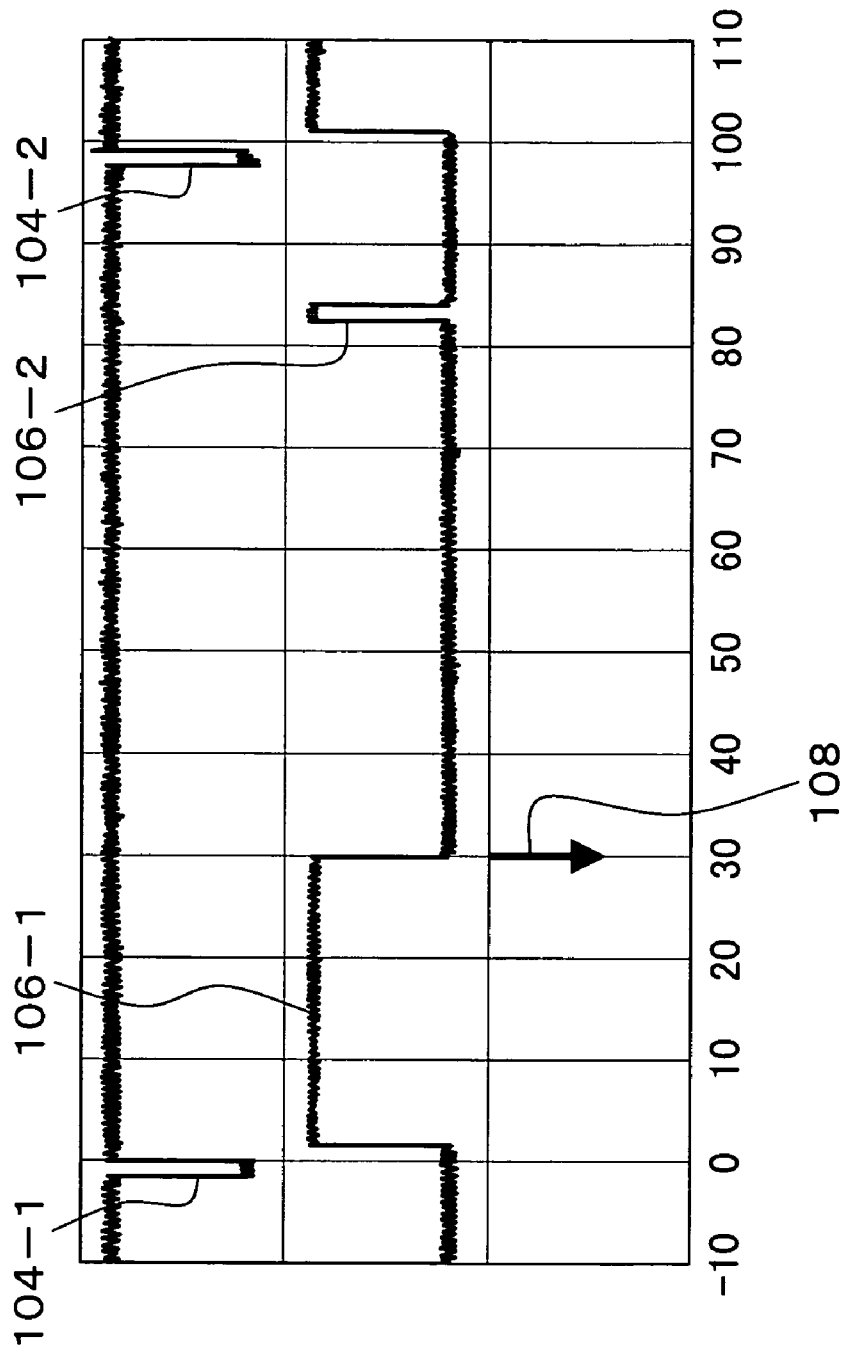
FIGS. 8A and 8B are time charts of timing of changing setting of a target revolution speed in the present embodiment.

FIGS. 8A and 8B are time charts of timing of changing the setting of the target revolution speed in the present embodiment. FIG. 8A shows the sector pulses 104-1 and 104-2 with respect to starting timing and end timing of one sector, which are reversed pulses of the sector pulses of FIG. 7B.

FIG. 8B shows an execution state of servo tasks for executing control processes with respect to the motor drive control unit 44 by the MPU 26; wherein a servo task 106-1 is executed in synchronization with the sector pulse 104-1, thereafter, a servo task 106-2 is executed after a time interval, and one sector is ended also after a time interval. According to such relation of the servo tasks, change of the target revolution speed, specifically, change in the target revolution speed register for generating sine wave disturbance in the present embodiment is executed as an additional transmission at target revolution speed timing 108 at the end of the servo task 106-1. In actual revolution control of the spindle motor 16, one process is not performed by one task process, but multi-rate control in which control is carried out by dividing it into a plurality of tasks is executed; and, when the timing at the end of the servo task 106-1 accompanying the multi-rate control is set as the target revolution speed changing timing 108, processes for measuring control characteristics of the motor control unit 44 can be executed without affecting normal revolution control tasks of the spindle motor. In execution of the measurement processes of the control characteristics of the motor drive control unit 44 of the present embodiment, control other than that of the spindle motor 16, for example, head positioning control by the voice coil motor 18 is not performed; therefore, the processing time of the MPU 26 between the sector pulses includes sufficient space, and the processes can be executed with no problem even when the tasks for the measurement processes according to the present embodiment are added.

Figure 9:
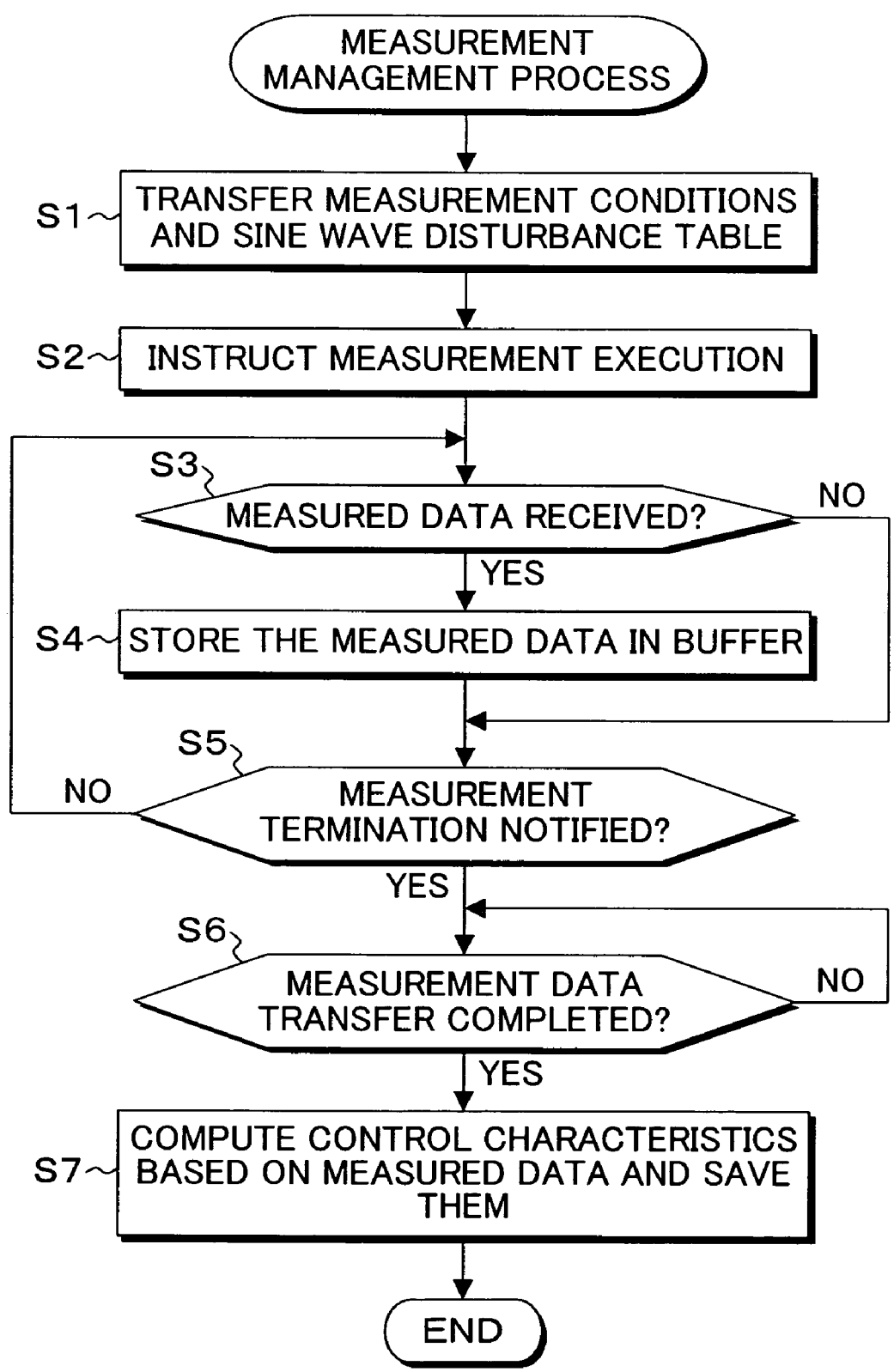
FIG. 9 is a flow chart of a measurement management process of the upper-level device in the present embodiment.

FIG. 9 is a flow chart of a measurement management process of the upper-level device in the present embodiment, which will be described below with reference to FIG. 2. In FIG. 9, in the measurement management process, in step S1, the measurement instruction unit 64 provided in the measurement management unit 62 transfers measurement conditions and the sine wave disturbance table which has been generated in advance to the magnetic disk device 10 which serves as a measuring object, and measurement execution is instructed in step S2. Accordingly, the firmware for measurement which has been downloaded in advance in the magnetic disk device 10 side is executed, thereby detecting, as measured data, the revolution speed involving generation of sine wave disturbance of the spindle motor revolution speed in order to compute the control characteristics of the motor drive control unit 44, and the measured data is transferred, for example, in a state when the buffer is full. When a reception response of the measured data from the magnetic disk device 10 is determined in step S3, the measured data is stored in the measured data file 70 in step S4. Subsequently, in step S5, if there is a measurement termination notification, the process proceeds to step S6 wherein transfer completion of the measured data is confirmed; and, when transfer completion of the measured data is confirmed, in step S7, based on the measured data stored in the measured data file 70, the control characteristic computing unit 68 obtains gains and phases with respect to frequencies control characteristics of the motor drive control unit 44 and stores them in the control characteristic file 72.

Figure 10A:
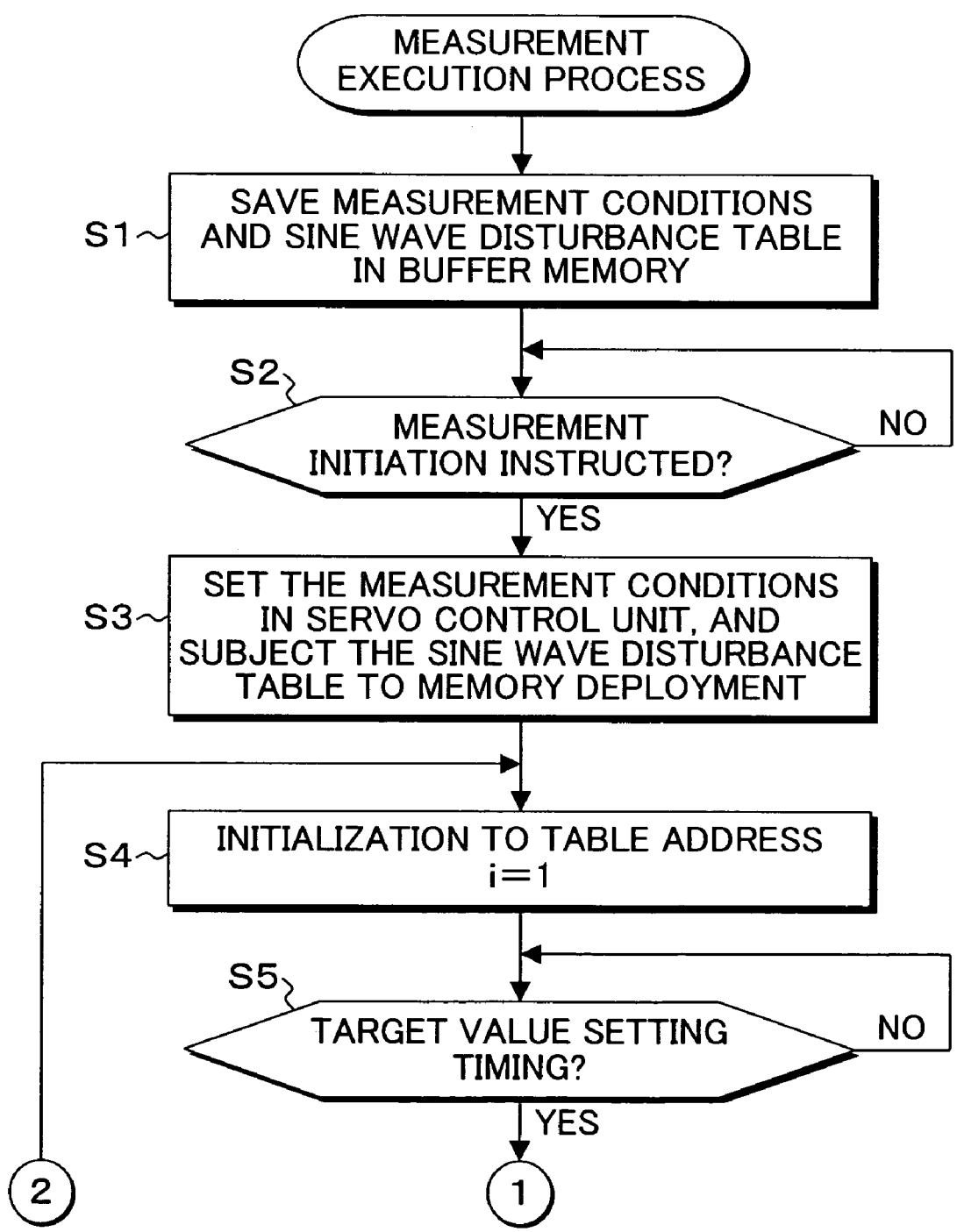
FIGS. 10A and 10B are flow charts of a measurement execution process of the magnetic disk device in the present embodiment.
Figure 10B:
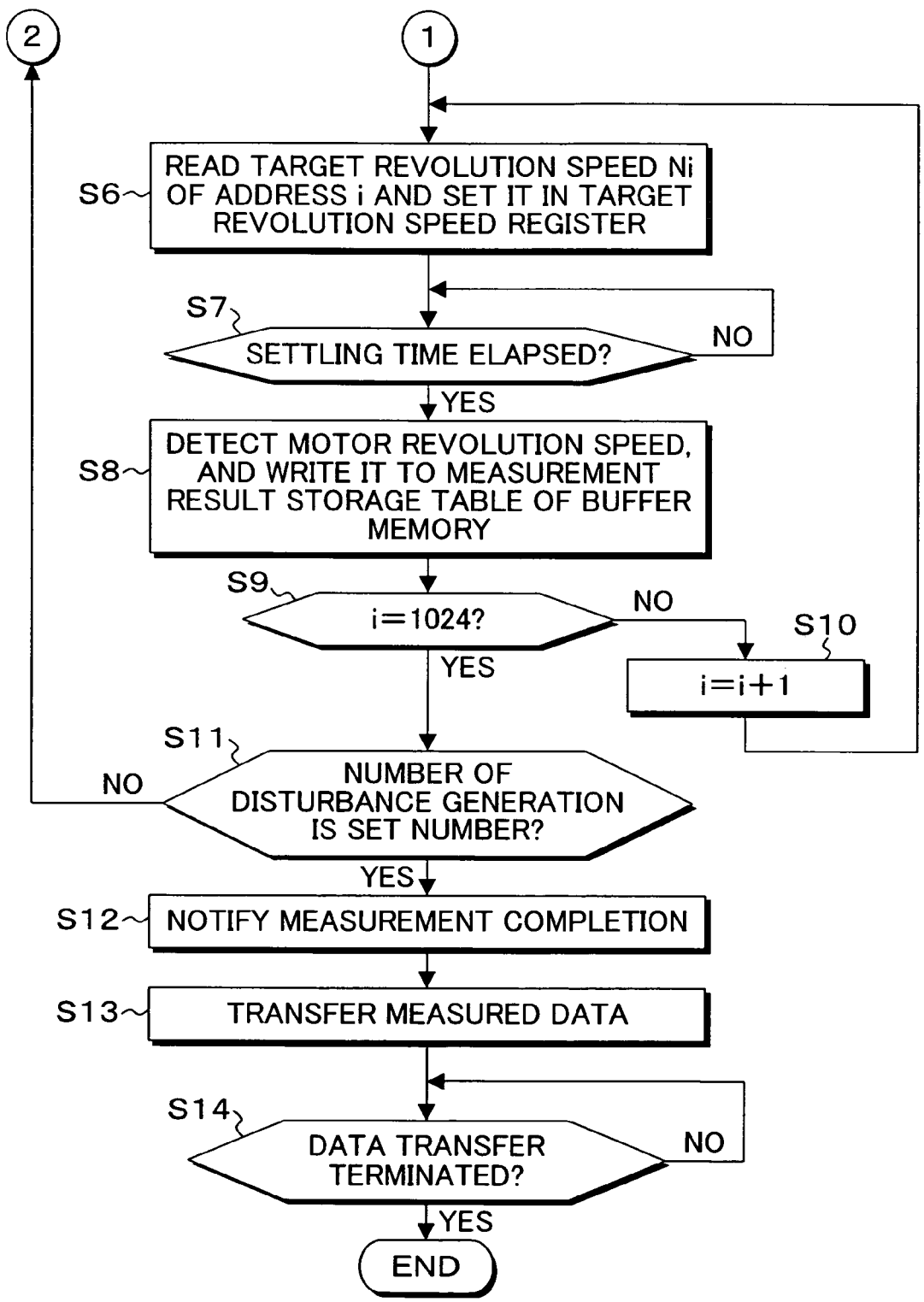

FIGS. 10A and 10B are flow charts of a measurement execution process of the magnetic disk device in the present embodiment, which will be described below with reference to FIGS. 1A and 1B. In FIGS. 10A and 10B, in the measurement execution process, in step S1, the measurement conditions and the sine wave disturbance table are received from the host 60 and saved in the buffer memory 38; and, when a measurement initiation instruction from the host 60 is determined in this state in step S2, in step S3, the measurement conditions are set in the motor drive control unit 44, and the sine wave disturbance table 52 of the buffer memory 38 is deployed to the memory 30 as the sine wave disturbance table 52-1. Then, in step S4, an address i in the sine wave disturbance table 52, for example, that shown in FIG. 6 is initialized to i=0001; then, in step S5, whether it is the target revolution speed setting timing 108 which is subsequent to the servo task 106-1 of the sector pulse 104-1 shown in FIGS. 8A and 8B or not is determined; and, when the target setting timing is determined, in step S6, the target revolution speed Ni of the address i is read and set in the target revolution speed register 84 shown in FIG. 3. As a result, as shown in FIG. 4, the value of the target revolution speed register 84 is set in the target revolution speed setting unit 88 of the servo processing unit 74, the target revolution speed Ni corresponding to the address i is set for the adder unit 90, deviation from the current detected speed which is detected from the detected speed register 86 is generated, a driving current is caused to flow through the spindle motor 16 such that the deviation is caused to be zero by the proportional integral unit 92, and the revolution speed is caused to follow a newly set target revolution speed Ni. Subsequently, elapse of predetermined settling time is waited for in step S7, and the process proceeds to step S8 wherein the revolution speed of the spindle motor 16 detected by the speed detecting unit 48, for example, based on the index pulses is retrieved and stored in the measured result storage table 54 of the buffer memory 38. Subsequently, in step S9, whether the address i reached the last address 1024 or not is checked, and, if it has not been reached, the address i is increased by one address, and the processes from step S6 are repeated. When the address i reaches the last address of 1024 through repetition of the processes of steps S6 to S10, the process proceeds to step S11 wherein the number of disturbance generation is the set number or not is checked. The number of disturbance generation is basically one cycle of sine wave disturbance; however, a plurality of cycles are sometimes used in order to improve accuracy. When a plurality of cycles are used, when it has not reached the set number, the process returns to step S4 again, wherein the table address is initialized to i=1, and similar processes are repeated for one cycle of the sine wave disturbance from step S5. When the number of disturbance generation reaches the set number in step S11, after measurement completion is notified to the host 60 in step S12, the measured data is transferred in step S13, and the series of processes are terminated when termination of the data transfer is determined in step S14. As a matter of course, the transfer of the measured data in step S13 may be arranged such that write succeeds at the point when the measured result storage table 54 which is reserved in the buffer memory 38 becomes full, and read transfer is performed.

FIGS. 11A, 11B, 12A and FIG. 12B are characteristic charts of gains and phases with respect to frequencies obtained by computing of measured data which is obtained by a measurement process which is executed for computing control characteristics of the motor drive control unit 44 wherein the magnetic disk device 10 to which the present embodiment is applied serves as a first sample.

FIG. 11A shows gains with respect to frequencies, wherein a closed loop response gain characteristic 110-1 of the first sample and a sensitivity function response gain characteristic 112-1. FIG. 11B shows a phase characteristic with respect to frequencies in the same first sample, wherein a closed loop response phase characteristic 110-2 and a sensitive function response phase characteristic 112-2 are shown. Herein, the closed loop response represents the degree how much an actual revolution number follows when the target revolution number is changed. The sensitive function response represents that how much the actual revolution number is affected by disturbance. It can be understood that, in the first sample, it well follows the target in the lower zone according to the closed loop response gain characteristic 110-1 of FIG. 11A, and disturbance is also compressed in the lower zone according to the sensitivity function response gain characteristic 112-1. However, as the frequency increases, it can be understood from the closed loop response gain characteristic 110-1 and the sensitivity function response gain characteristic 112-1 that control cannot follow the target speed. Particularly, the closed loop response gain characteristic 110-1 and the sensitivity function response characteristic 112-1 have peaks ion the higher zone side, and having the peaks in this manner indicates that, when servo control is performed, there is a frequency zone where the followability of the revolution number and influence with respect to disturbance is unnecessarily deteriorated. Herein, the peak gain in the closed loop response gain characteristic 110-1 is 7.72 db, the peak frequency is 20.0 Hz, and the frequency of −3 db band for determining bandwidth is 25.45 Hz.

FIGS. 12A and 12B show gain characteristics and phase characteristics of an open loop response and a controller response of the first sample which is same as FIGS. 11A and 11B. FIG. 12A shows an open loop response gain characteristic 114-1 and a controller response gain characteristic 116-1, and, corresponding to them, FIG. 12B shows an open loop response phase characteristic 114-2 and a controller response phase characteristic 116-2. Herein, the open loop response characteristic is a conjunction of a controller response characteristic and a characteristic of a control object. The control object means a characteristic of −20 db since it is speed control in the case of spindle motor control. In the open loop response gain characteristic 114, a zero-cross frequency is 17.78 Hz, a phase margin provided in the open loop response phase characteristic 114-2 is 22.69 [deg], and a gain margin in the open loop response gain characteristic 114 is 3.57 [db]. Herein, the phase margin is provided by the difference between the phase angle in the open loop response phase characteristic 114-2 when the open loop response gain characteristic 114-1 crosses zero and −180°. Also, the gain margin represents a width with respect to the gain 0 of the open loop response gain characteristic 114-1 when the open loop response phase characteristic 114-2 reaches −180°. Furthermore, the controller characteristics provided by the controller response gain characteristic 116-1 and the controller response phase characteristic 116-2 are lead-lag type. The lead-lag type is a kind of a smoothing filter, and, since they resemble gain characteristics and phase characteristics of the smoothing filter, they are lead-lag type.

FIGS. 13A, 13B, 14A and FIG. 14B are characteristic charts of gains and phases obtained from measured data by executing a measurement process for another second sample which is same as the magnetic disk device of the present embodiment.

Figure 13A:
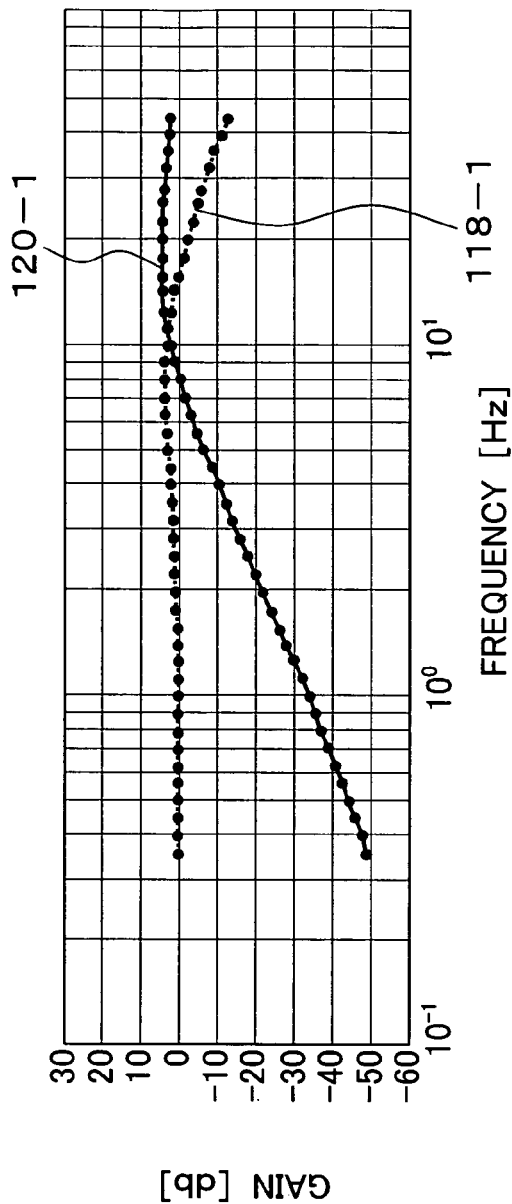
FIGS. 13A and 13B are characteristic charts of gains and phases with respect to frequencies of closed loop responses and sensitive function responses obtained from measured data of a second sample.
Figure 13B:
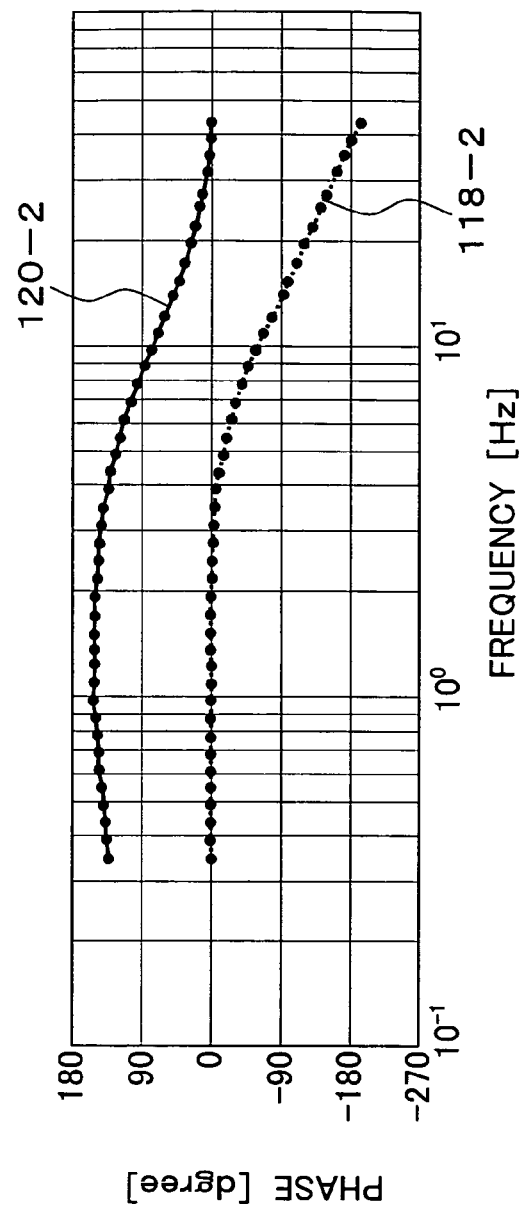

FIGS. 13A and 13B show characteristic charts of gains and phases with respect to frequencies of the closed loop response and sensitivity function response of the second sample. FIG. 13A shows a closed loop response gain characteristic 118-1 and a sensitivity function response gain characteristic 120-1 of the second sample, and FIG. 13B shows a closed loop response phase characteristic 118-2 and a sensitivity function response phase characteristic 120-2. In the closed loop response gain characteristic 118-1 of FIG. 13A, the peak gain is 3.03 db, the peak frequency is 8.0 Hz, and −3 db band is 20.0 Hz. And, in the sensitivity function response gain characteristic 120-1, the peak gain is 3.74 db, the peak frequency is 18.0 Hz, and −3 db band is 7.06 Hz.

FIGS. 14A and 14B show characteristics with respect to frequencies of gains and phases of the open loop response and controller response in the second sample which is same as FIGS. 13A and 13B. FIG. 14A shows an open loop response gain characteristic 122-1 and a controller response gain characteristic 124-1, and, corresponding to them, FIG. 14B shows an open loop response phase characteristic 122-2 and a controller response phase characteristic 124-2. Regarding the open loop response gain characteristic 122-1 of FIG. 14A, the zero-cross frequency is 10.63 Hz, and the gain margin in the open loop response gain characteristic 122-1 when the open loop response phase characteristic 122 of FIG. 14B reaches −180° is 12.90 db. The controller response characteristics provided by the controller response gain characteristic 124-1 and the controller response phase characteristic 124-2 are lead-lag type as well as the case of the first sample of FIGS. 12A and 12B.

FIG. 15 collectively shows a list of the zero-cross frequencies, the phase margins, the gain margins, the peak gains, the peak frequencies, and −3 db bands of the open loop responses, sensitivity functions, and closed loop responses of the first sample and the second sample shown in FIGS. 11A to 14B. As is clear from the open loop responses in the list shown in FIG. 15, the servo band is apparently extended compared with the second sample, and, when the zero-cross frequency is changed from 17.78 Hz to the vicinity of 11 Hz as the second sample, characteristics equivalent to the second sample can be obtained. When the characteristics obtained by the measurement method of the present invention are compared in this manner, they can be adjusted to an optimal state by readily analyzing the revolution control characteristics of the spindle motor in the magnetic disk device. In the above described embodiment, the sine wave disturbance is generated in the target revolution speed by use of the sine wave disturbance table 52 transferred from the host as the disturbance generating unit 46; however, the sine wave disturbance may be generated by receiving the amplitude ±ΔN and the angular speed ω of the above described expression (1) from the host 60 as measurement conditions and repeating the computation of the expression (1). In the calculation of the sine wave disturbance according to the expression (1), the angular speed can be readily changed compared with the case in which the sine wave disturbance table has to be generated every time the angular speed ω is changed. In the above described embodiment, the firmware downloaded from the host 60 for performing the measurement process for computing the control characteristics of the motor drive control unit 44 is eliminated from the magnetic disk device 10 when the measurement process is finished; however, in accordance with needs, it may be shipped while the firmware for performing the measurement process of the motor drive control unit 44 is loaded as it is. When the measurement firmware of the control characteristics of the motor drive control unit 44 is caused to remain, the control characteristics according to the motor drive control unit 44 can be measured in accordance with needs in the stage of user usage after shipment. In the present embodiment, the measured data measured in the magnetic disk device is transferred to the host 60, and the characteristics of the gains and phases with respect to frequencies of the motor drive control unit 44 are computed from the measured data in the host 60 side; however, it maybe configured such that software for computing control characteristics is downloaded to the magnetic disk device 10, the control characteristics are computed in the magnetic disk device side from the measured data, and the computing result is transferred to the host 60. The present invention also provides a control characteristic measurement program used in computing of the control characteristics of the motor drive control unit 44 which is downloaded to the magnetic disk device 10 of the present embodiment and executed therein, and this program has the contents shown in the flow charts of FIGS. 10A and 10B. The present invention also provides a recording medium storing the control characteristic measurement program to be executed in the MPU 26 of the magnetic disk device 10. Examples of this recording medium includes portable recording media such as a CD-ROM, a floppy (R) disk, a DVD disk, a magneto-optical disk, and an IC card; storage devices such as hard disk drives provided inside/outside computer systems. The present embodiment employed, as an example, the magnetic disk device as the storage device; however, as long as it is a device which similarly performs read and/or write of data by rotating a disk medium at a constant speed by a medium rotating motor, it can be applied to an arbitrary storage device such as an optical disk device and a magneto-optical disk device without modification. The disk device has been described as an example of the rotary-motor-loaded device; however, it can be similarly applied to a rotary-motor-loaded device which uses a rotary motor for rotating a rotating object at a predetermined revolution speed. A serial ATA which can also perform bidirectional communication is shown as an example of the interface in the present embodiment; however, it is not limited thereto, and an arbitrary interface such as a parallel ATA, USB may be used. The present invention is not limited to the above described embodiment, includes arbitrary modifications that do not impair the object and advantages thereof, and is not limited by numerical values shown in the above described embodiment.

What is claimed is:

1. A rotary-motor-loaded device characterized by having
   a motor drive control unit for controlling drive of a rotary motor for rotating a rotation object at a predetermined revolution speed;
   a disturbance generating unit for generating sine wave disturbance in the revolution speed of the rotary motor when a rotation control characteristic is to be measured;
   a speed detecting unit for detecting the revolution speed of the rotary motor as measured data while the disturbance is being generated by the disturbance generating unit; and
   a measured data transferring unit for outputting the measured data detected by the speed detecting unit to a control characteristic computing unit.

2. The device according to claim 1, characterized in that the disturbance generating unit reads a target revolution speed which changes as a sine wave from a sine value table and sets the speed in the motor drive control unit.

3. The device according to claim 2, characterized in that the disturbance generating unit computes a target revolution speed which changes as a sine value based on a predetermined amplitude and frequency and set the speed in the motor drive control unit.

4. The device according to claim 1, characterized by further having
   an interface for transferring a command and data to and from an upper-level device, and
   a buffer memory for storing data transmitted/received via the interface; wherein
   the disturbance generating unit reads measurement control information transferred from the upper-level device via the interface and stored in the buffer memory and generates the sine wave disturbance,
   the speed detecting unit reserves a measured result storage table in the buffer memory upon measurement initiation and writes the revolution speed detected during measurement as the measured data in the measured result table, and
   the measured data transferring unit reads the measured data stored in the measured result storage table and transfers the data to the control characteristics computing unit of the upper-level device by the interface.

5. The device according to claim 4, characterized in that the measured data transferring unit reads, in parallel with the write of the measured data to the measured result storage table performed by the speed detecting unit, measured data which is written before that and transfers the data to the upper-level device.

6. The device according to claim 1, characterized in that the speed detecting unit detects the revolution speed of the rotary motor based on an index signal which is output in accordance with revolution of a storage medium which is the rotation object.

7. The device according to claim 1, characterized in that the speed detecting unit detects the revolution speed of the rotary motor based on a motor index signal which is output in accordance with revolution of the rotary motor.

8. The device according to claim 1, characterized in that the measured data transferring unit outputs the measured data to the control characteristic computing unit and causes the unit to compute a gain characteristic and a phase characteristic with respect to a frequency of the motor drive control unit.

9. The device according to claim 1, characterized by further having a control characteristic computing unit for computing a gain characteristic and a phase characteristic with respect to a frequency of the motor drive control unit based on the measured data.

10. The device according to claim 1, characterized in that the motor drive control unit is a circuit chip wherein everything about a drive control system required for drive control of the rotary motor is incorporated in the chip, and at least a target revolution speed can be set from outside.

11. A control characteristic measurement method of a rotary-motor-loaded device having a motor drive control unit for controlling drive of a rotary motor for rotating a rotation object at a predetermined revolution speed, the control characteristic measurement method of the rotary-motor-loaded device characterized by having a disturbance generating step of generating sine wave disturbance in the revolution speed of the rotary motor when a rotation control characteristic is to be measured;

a speed detecting step of detecting the revolution seed of the spindle motor as measured data while the disturbance is being generated in the disturbance generating step; and a measured data transferring step of outputting the measured data detected in the speed detecting step to a control characteristic computing unit.

12. The method according to claim 11, characterized in that a control characteristic measurement program is downloaded to the rotary-motor-loaded device from an upper-level device.

13. The method according to claim 12, characterized in that, in the disturbance generating step, a target revolution speed which changes as a sine wave is read from a sine value table transferred from the upper-level device and is set in the motor drive control unit.

14. The method according to claim 12, characterized in that, in the disturbance generating step, a target revolution speed which changes as a sine value is computed based on a predetermined amplitude and frequency transferred from the upper-level device and set in the motor drive control unit.

15. The method according to claim 12, characterized in that the rotary-motor-loaded device further has an interface for transferring a command and data to and from an upper-level device, and a buffer memory for storing data transmitted/received via the interface; wherein, in the disturbance generating step, measurement control information transferred from the upper-level device via the interface and stored in the buffer memory is read and the sine wave disturbance is generated;

in the speed detecting step, a measured result storage table is reserved in the buffer memory upon measurement initiation and the revolution speed detected during measurement is written as the measured data in the measured result table; and, in the measured data transferring step, the measured data stored in the measured result storage table is read and is transferred to the upper-level device by the interface.

16. The method according to claim 15, characterized in that, in the measured data transferring step, in parallel with the write of the measured data to the measured result storage table performed in the speed detecting step, measured data which is written before that is read and transferred to the upper-level device.

17. A machine-readable recording medium which stores a program characterized by causing a computer of a rotary-motor-loaded device having a motor drive control unit for controlling a rotary motor for rotating a rotation object at a predetermined speed to execute a disturbance generating step of generating sine wave disturbance in the revolution speed of the rotary motor when a rotation control characteristic is to be measured;

a speed detecting step of detecting the revolution speed of the rotary motor as measured data while the disturbance is being generated in the disturbance generating step; and a measured data transferring step of outputting the measured data detected in the speed detecting step to a control characteristic computing unit for computing the control characteristics of the motor drive control unit.

18. The recording medium according to claim 17, characterized in that, in the disturbance generating step, a target revolution speed which changes as a sine wave is read from a sine value table and is set in the motor drive control unit.

19. The recording medium according to claim 17, characterized in that, in the disturbance generating step, a target revolution speed which changes as a sine value is computed based on a predetermined amplitude and cycle and set in the drive control unit.

* * * * *

UNITED STATES PATENT AND TRADEMARK OFFICE
CERTIFICATE OF CORRECTION

| | |
|---|---|
| PATENT NO. | : 7,602,129 B2 |
| APPLICATION NO. | : 11/489696 |
| DATED | : October 13, 2009 |
| INVENTOR(S) | : Shirai et al. |

It is certified that error appears in the above-identified patent and that said Letters Patent is hereby corrected as shown below:

In the Claims:

Col. 17, Line 1    Delete "seed" and insert --speed-- in its place.
Claim 11

Signed and Sealed this

Twenty-sixth Day of January, 2010

David J. Kappos
*Director of the United States Patent and Trademark Office*